(12) United States Patent
Kim et al.

(10) Patent No.: US 10,132,065 B2
(45) Date of Patent: Nov. 20, 2018

(54) DRAIN PIPE ASSEMBLY FOR INSTALLATION OF WASHSTAND

(71) Applicant: Dong Myung Kim, Namyangju-si, Gyeonggi-do (KR)

(72) Inventors: Chang Hwan Kim, Guri-si (KR); Dong Myung Kim, Namyangju-si (KR)

(73) Assignee: Dong Myung Kim, Namyangju-si, Gyeonggi-Do (KR)

( * ) Notice: Subject to any disclaimer, the term of this patent is extended or adjusted under 35 U.S.C. 154(b) by 224 days.

(21) Appl. No.: 14/768,342

(22) PCT Filed: Feb. 25, 2014

(86) PCT No.: PCT/KR2014/001537
§ 371 (c)(1),
(2) Date: Aug. 17, 2015

(87) PCT Pub. No.: WO2014/133302
PCT Pub. Date: Sep. 4, 2014

(65) Prior Publication Data
US 2016/0010316 A1  Jan. 14, 2016

(30) Foreign Application Priority Data

Feb. 26, 2013 (KR) .................. 10-2013-0020341
Mar. 20, 2013 (KR) .................. 10-2013-0029968
(Continued)

(51) Int. Cl.
*E03C 1/14* (2006.01)
*E03C 1/28* (2006.01)
(Continued)

(52) U.S. Cl.
CPC .................. *E03C 1/14* (2013.01); *E03C 1/12* (2013.01); *E03C 1/28* (2013.01); *E03C 1/284* (2013.01); *F16L 37/12* (2013.01)

(58) Field of Classification Search
CPC ..... E03C 1/12; E03C 1/14; E03C 1/28; E03C 1/284; F16L 37/12
(Continued)

(56) References Cited

U.S. PATENT DOCUMENTS 3,314,085 A * 4/1967 Minella .................... E03C 1/23
                                                          4/287
3,456,264 A * 7/1969 Flagg ....................... E03C 1/14
                                                          4/645
5,893,396 A * 4/1999 Vagle ....................... E03C 1/20
                                                          4/645

FOREIGN PATENT DOCUMENTS

KR    20-2008-0001524 U    6/2008
KR      20-0449468 Y1      7/2010
(Continued)

OTHER PUBLICATIONS

Search Report for International Application No. PCT/KR2014/001537.

*Primary Examiner* — Tuan N Nguyen
(74) *Attorney, Agent, or Firm* — LRK Patent Law Firm

(57) ABSTRACT

A drain pipe assembly for installation of a basin includes: a drain pipe which is inserted in a drain port formed in a base of basin and has a flange of which an upper end is caught by the drain port; and a fastening member which fixes the basin against the flange, wherein the fastening member pulls the drain pipe, which is exposed below the basin, in a downward direction, to upwardly press the basin, thereby fastening the basin and the drain pipe.

2 Claims, 38 Drawing Sheets

(30)  Foreign Application Priority Data

Mar. 27, 2013 (KR) .......................... 10-2013-0032782
Jun. 14, 2013 (KR) .......................... 10-2013-0068647
Nov. 18, 2013 (KR) .......................... 10-2013-0139981

(51) Int. Cl.
      *E03C 1/284*    (2006.01)
      *E03C 1/12*     (2006.01)
      *F16L 37/12*    (2006.01)

(58) Field of Classification Search
      USPC .......................................... 4/645, 679, 252.2
      See application file for complete search history.

(56) References Cited

FOREIGN PATENT DOCUMENTS

| | | |
|---|---|---|
| KR | 20-2010-0011061 U | 11/2010 |
| KR | 20-0459796 Y1 | 5/2012 |
| KR | 10-2013-0030614 A | 3/2013 |

\* cited by examiner

[Fig 3]
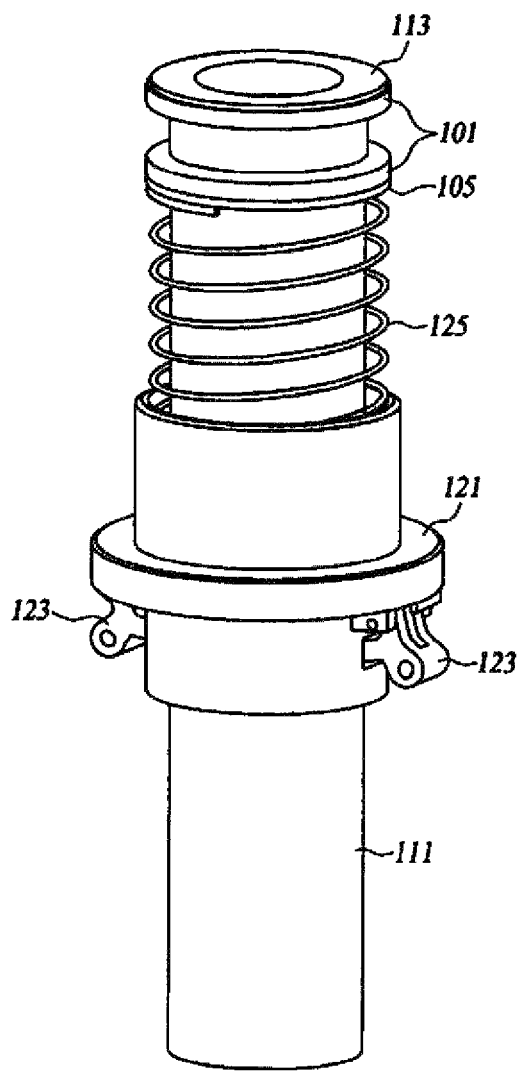

[Fig 4]
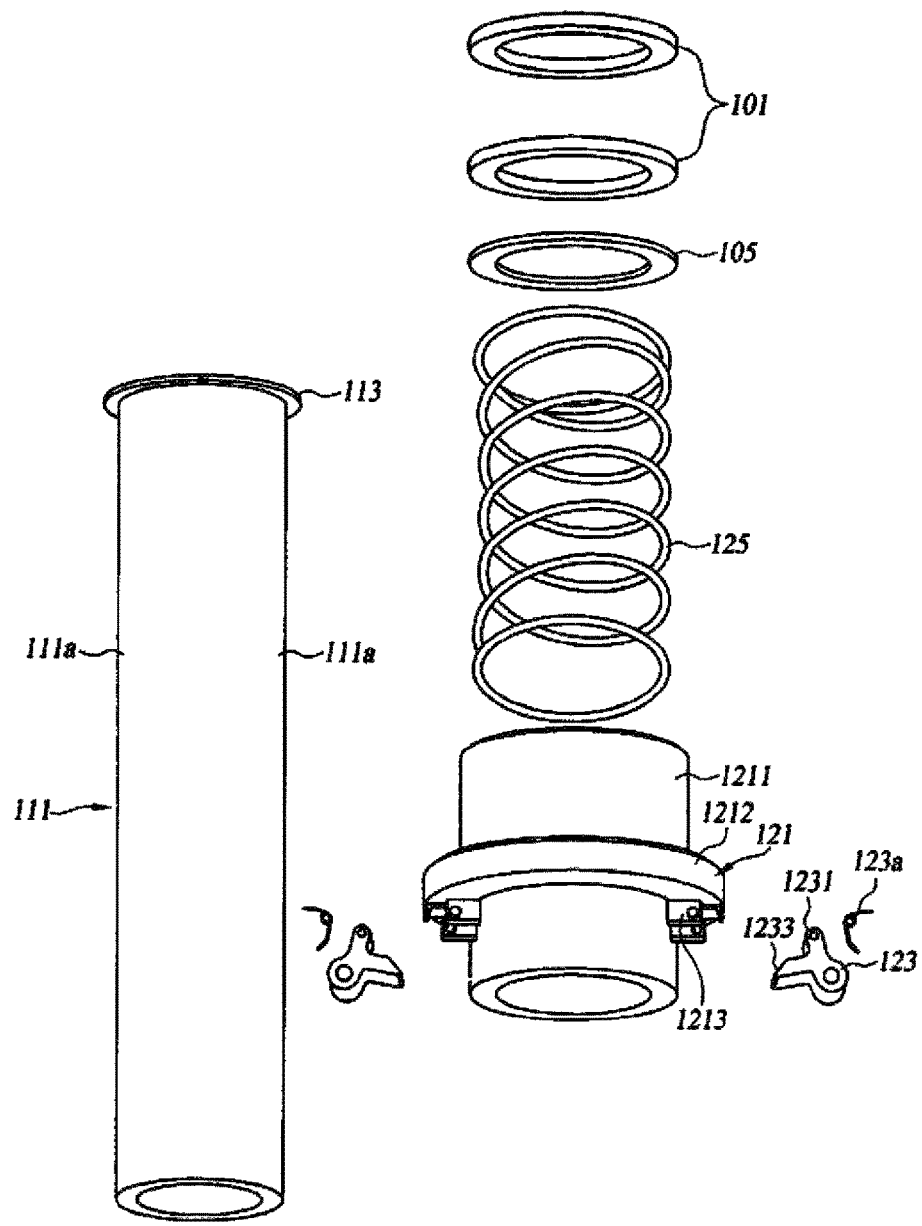

【Fig 5】
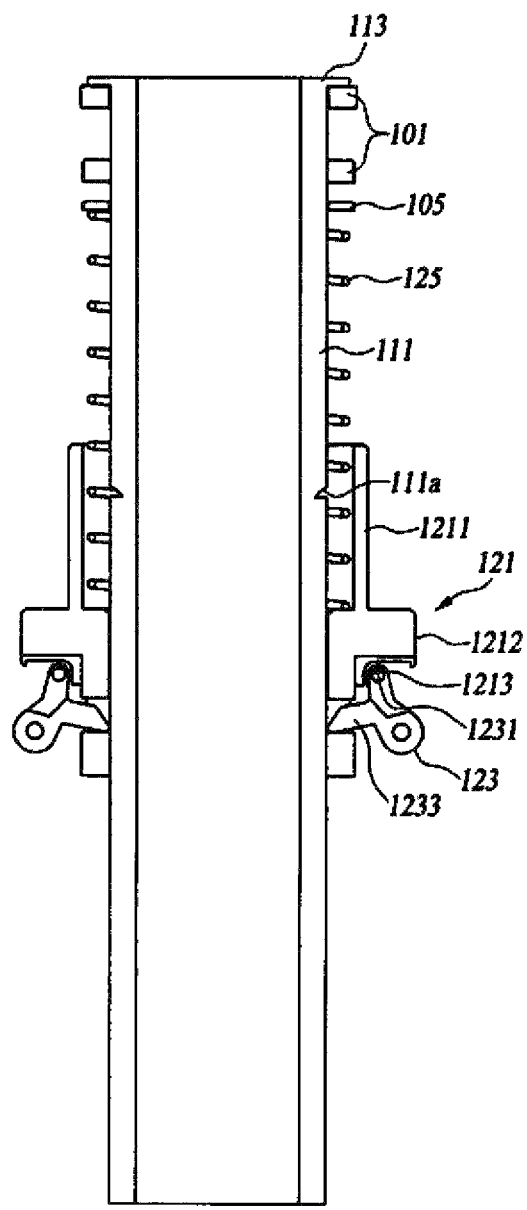

[Fig 6]
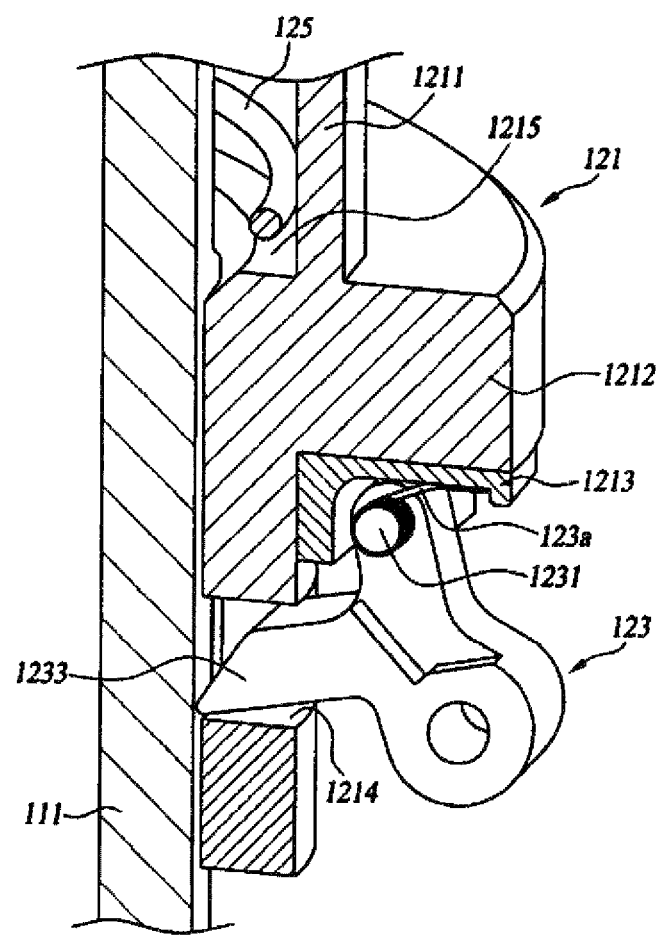

[Fig 7]
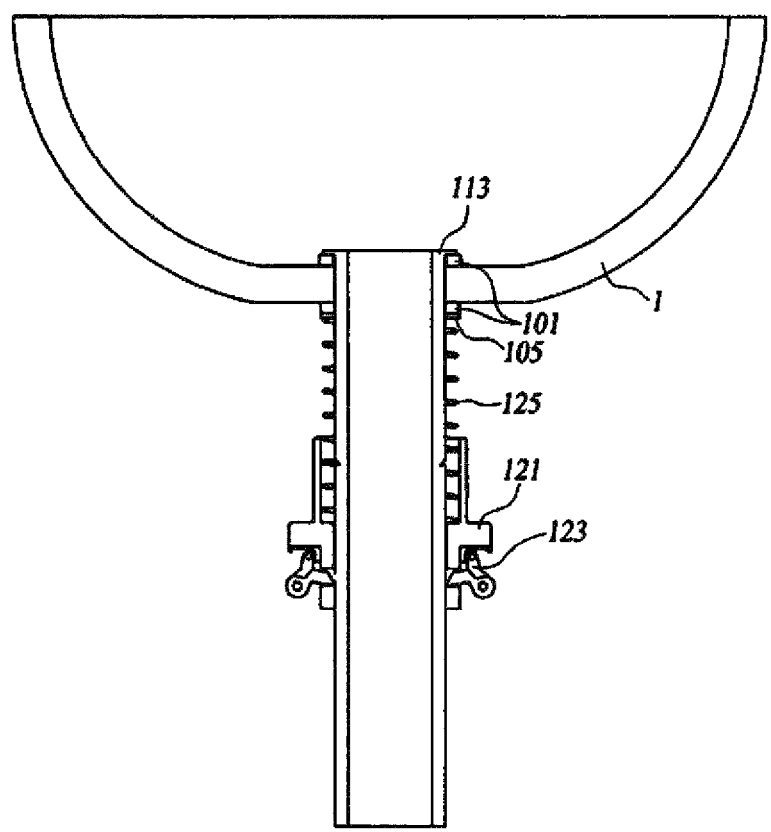

[Fig 8]
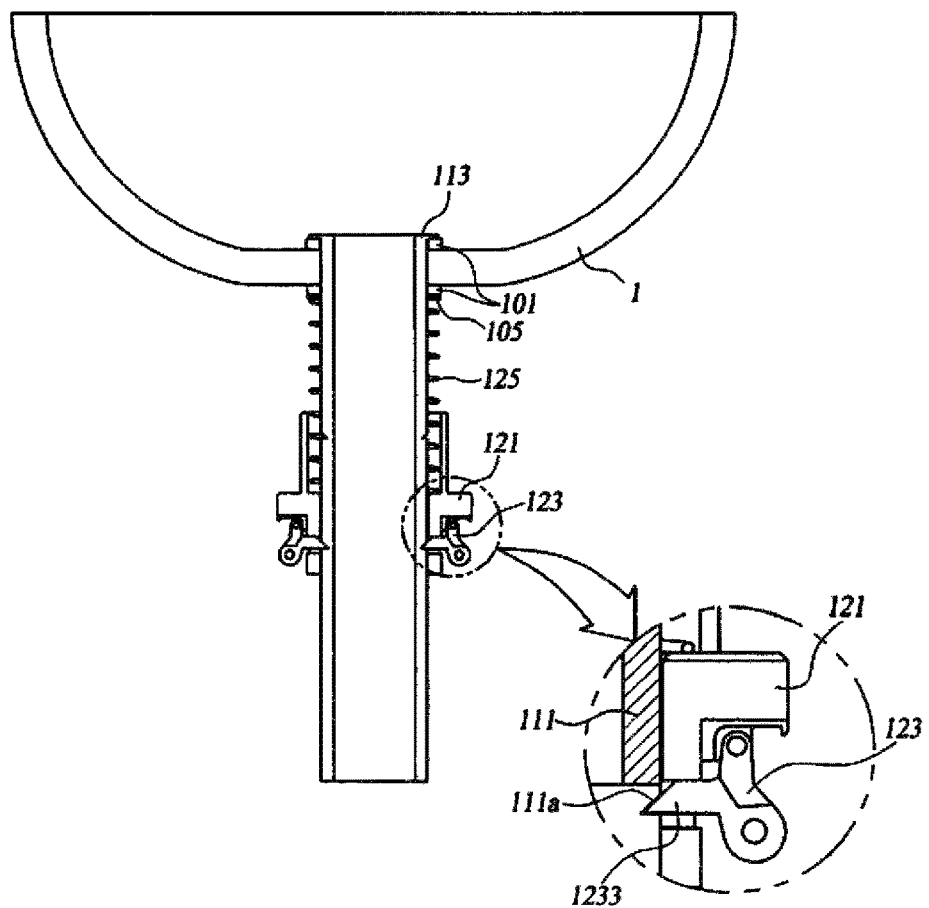

[Fig 9]
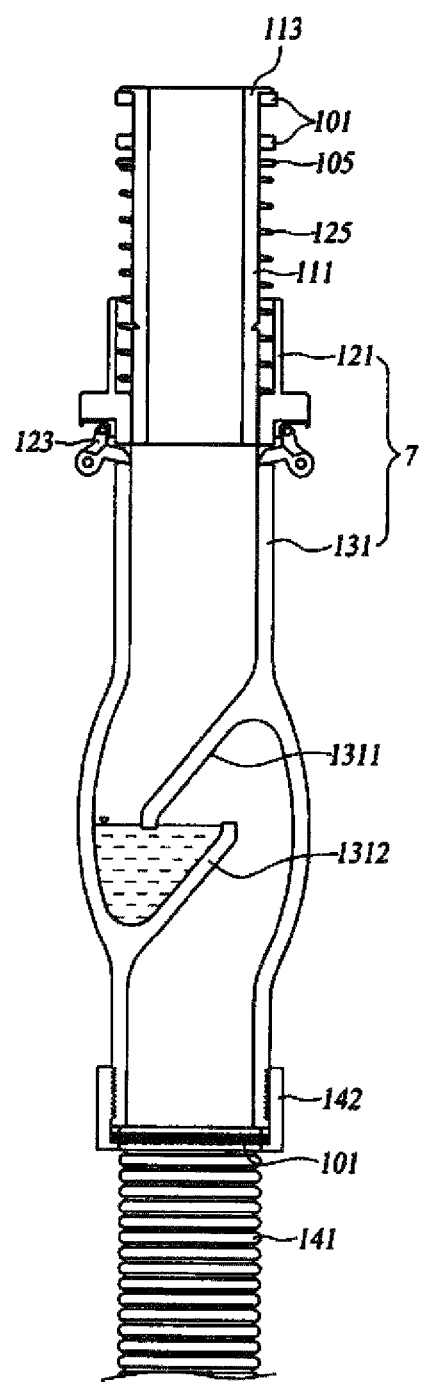

[Fig 10]
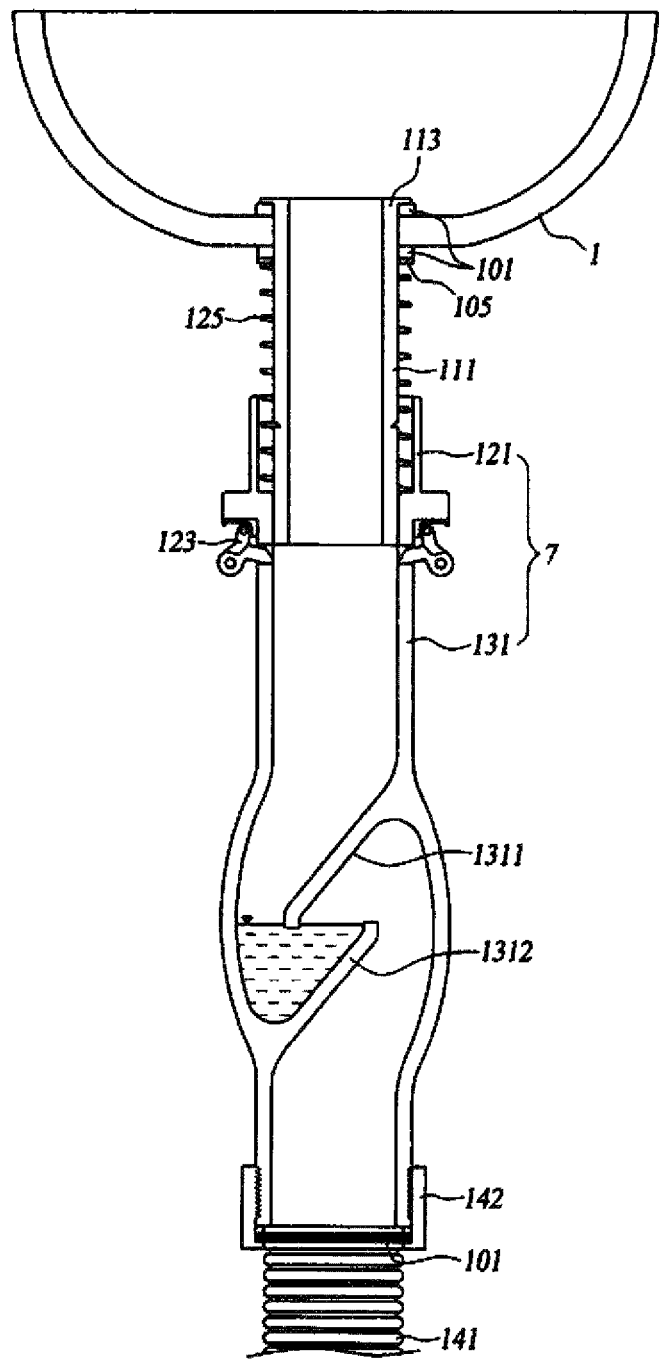

[Fig 11]
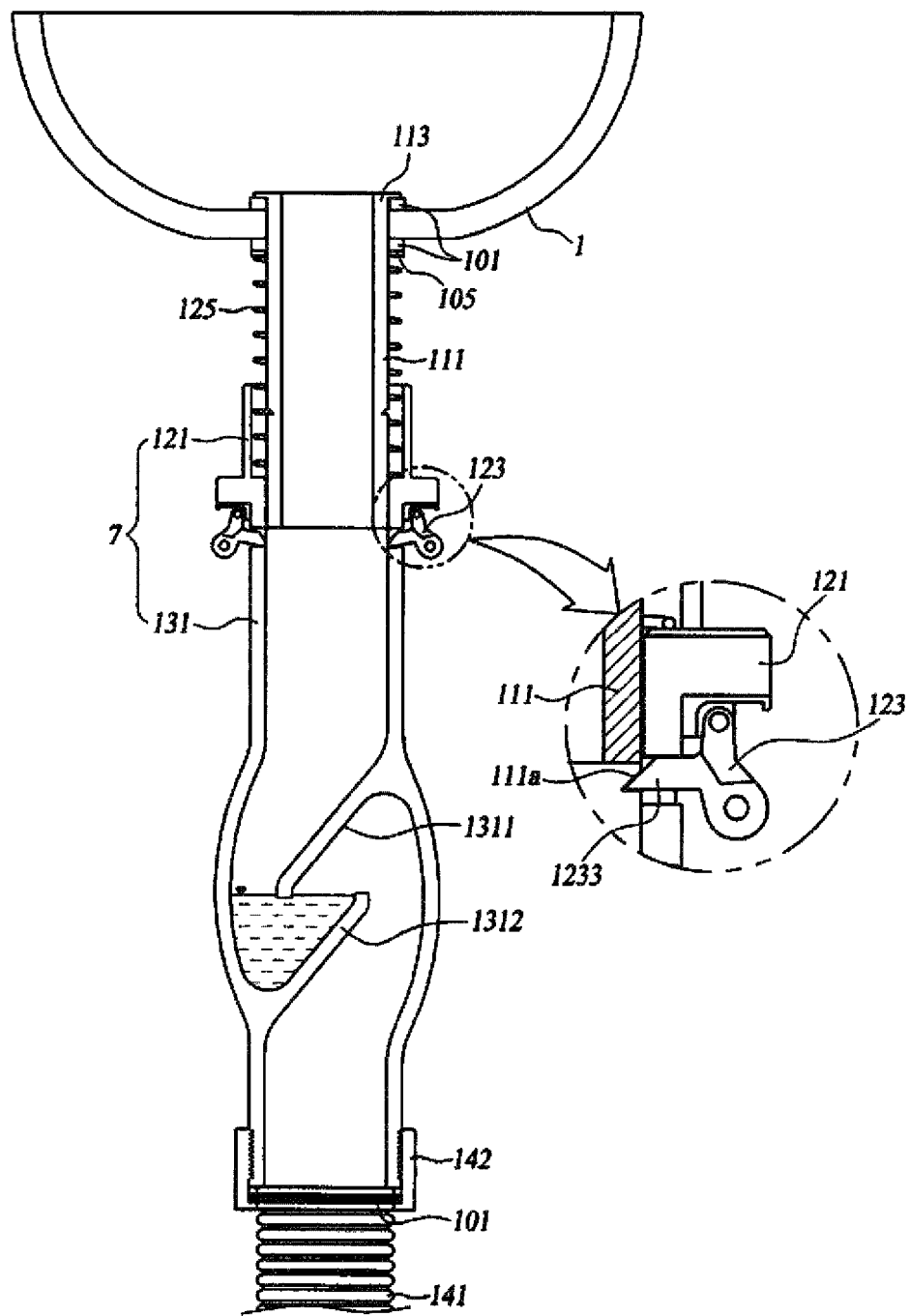

[Fig 12]
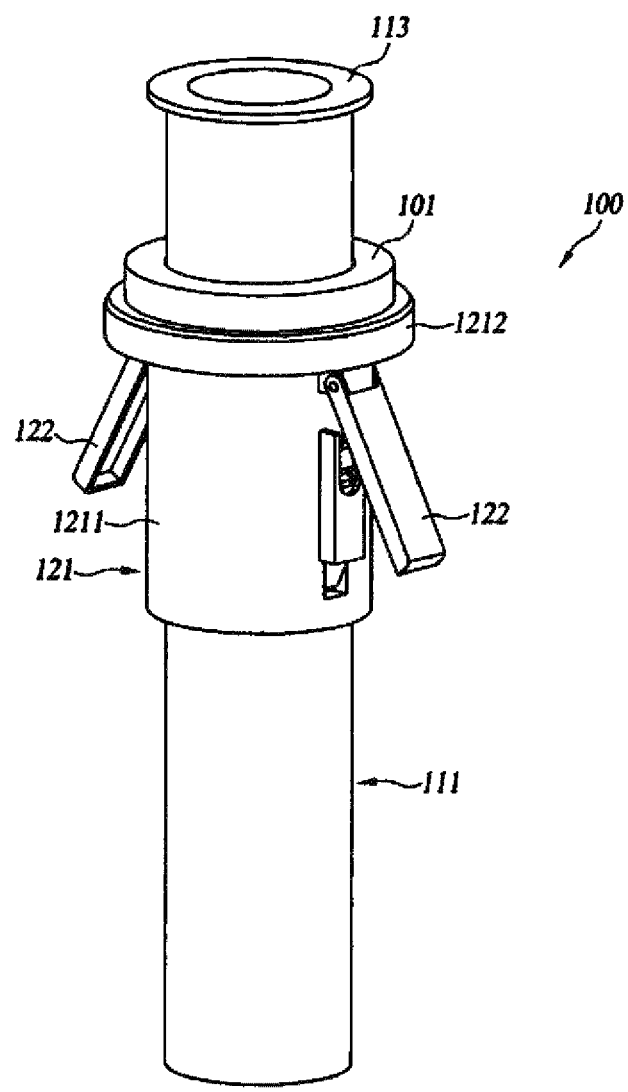

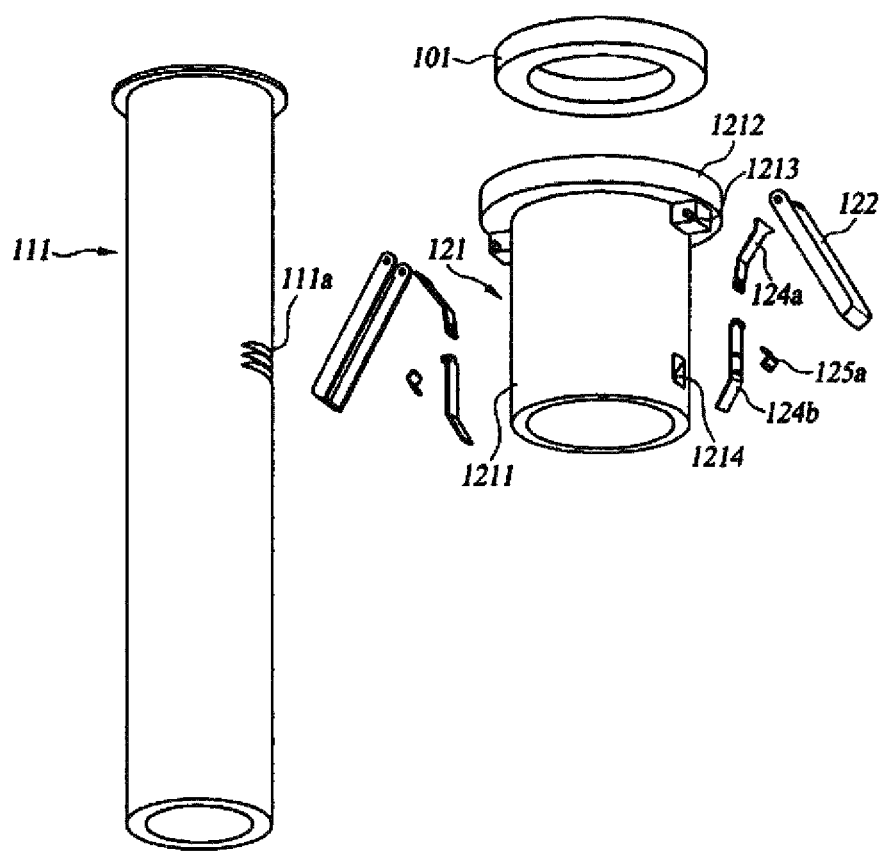
[Fig 13]

[Fig 14]
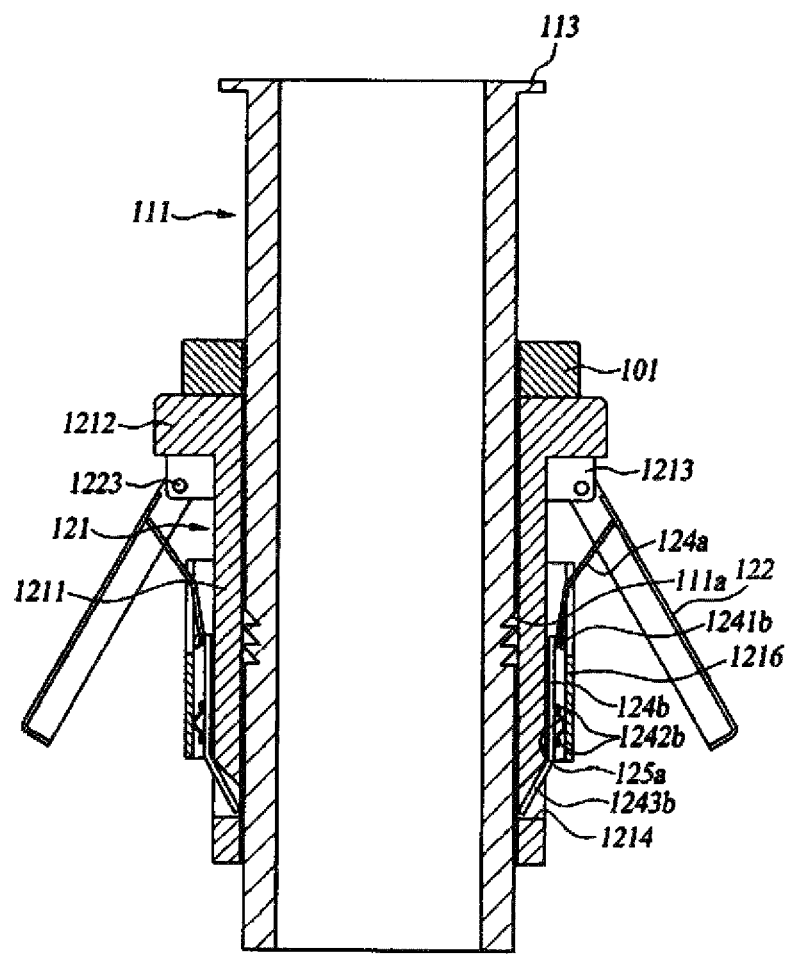

[Fig 15]
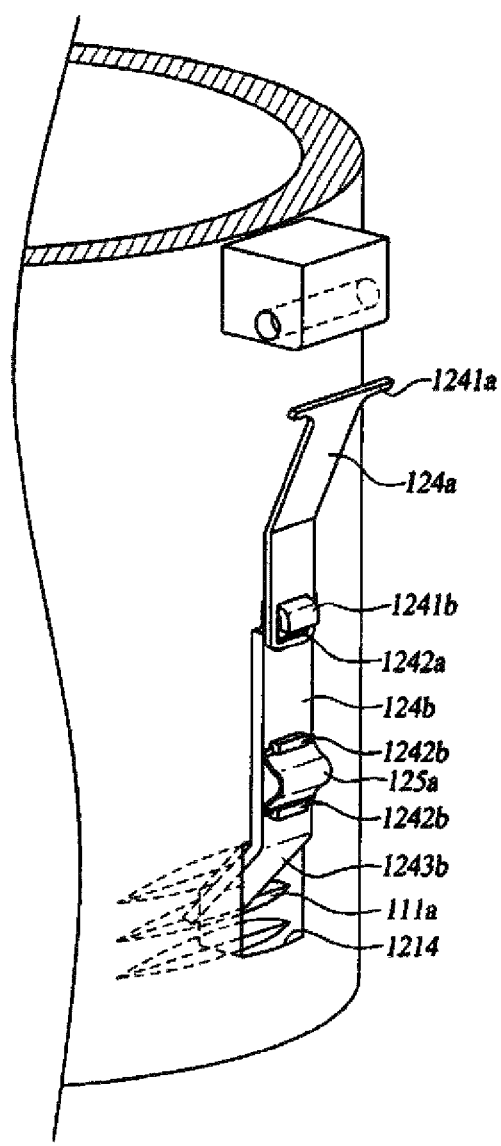

[Fig 16]
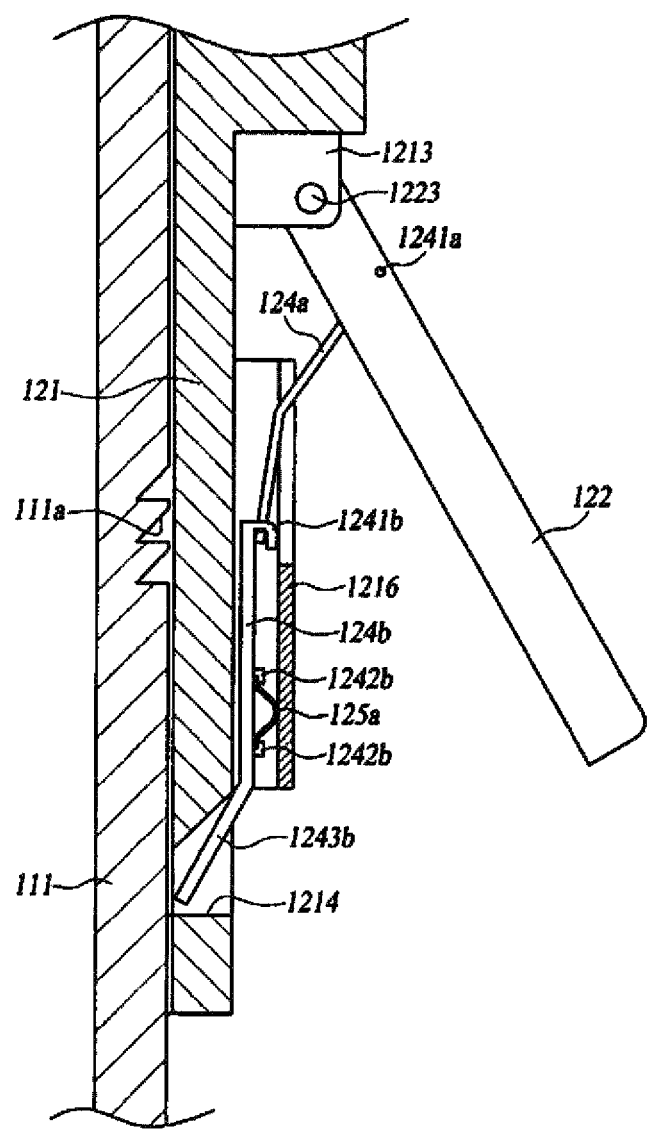

[Fig 17]
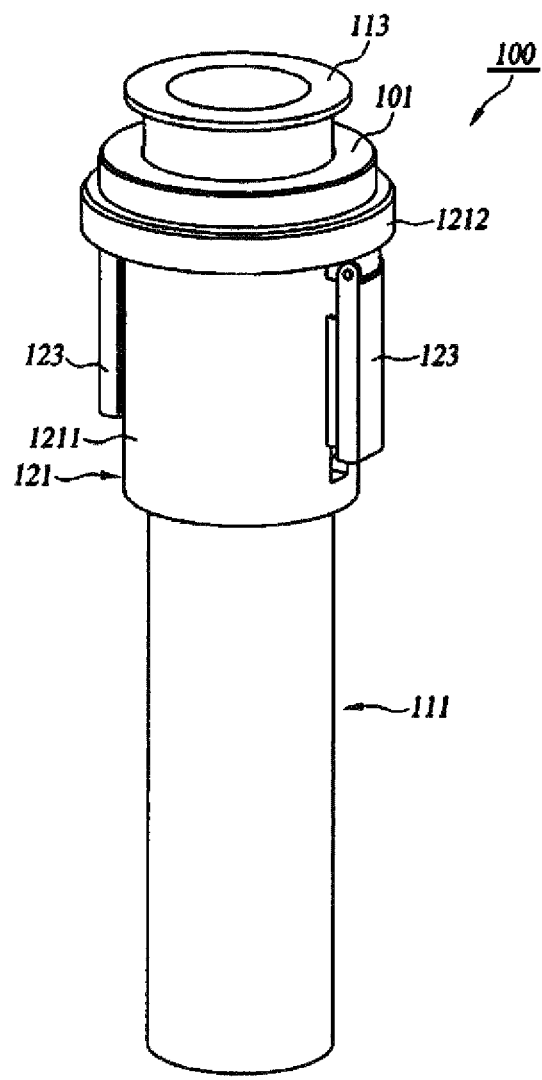

[Fig 18]
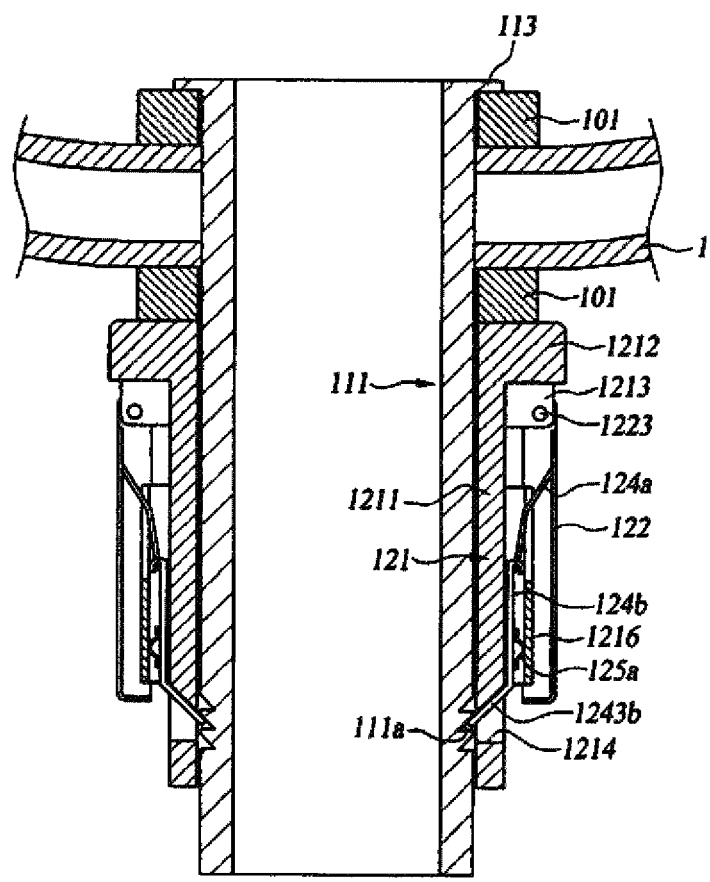

[Fig 19]
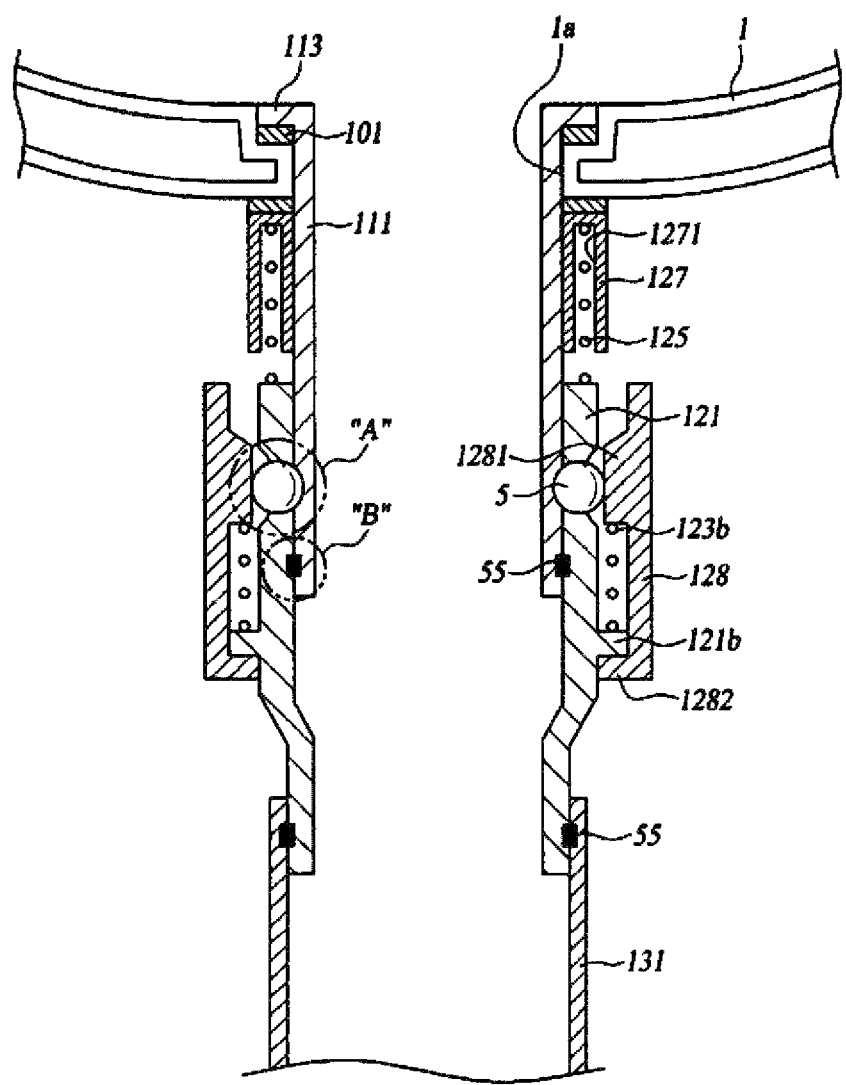

[Fig 20]
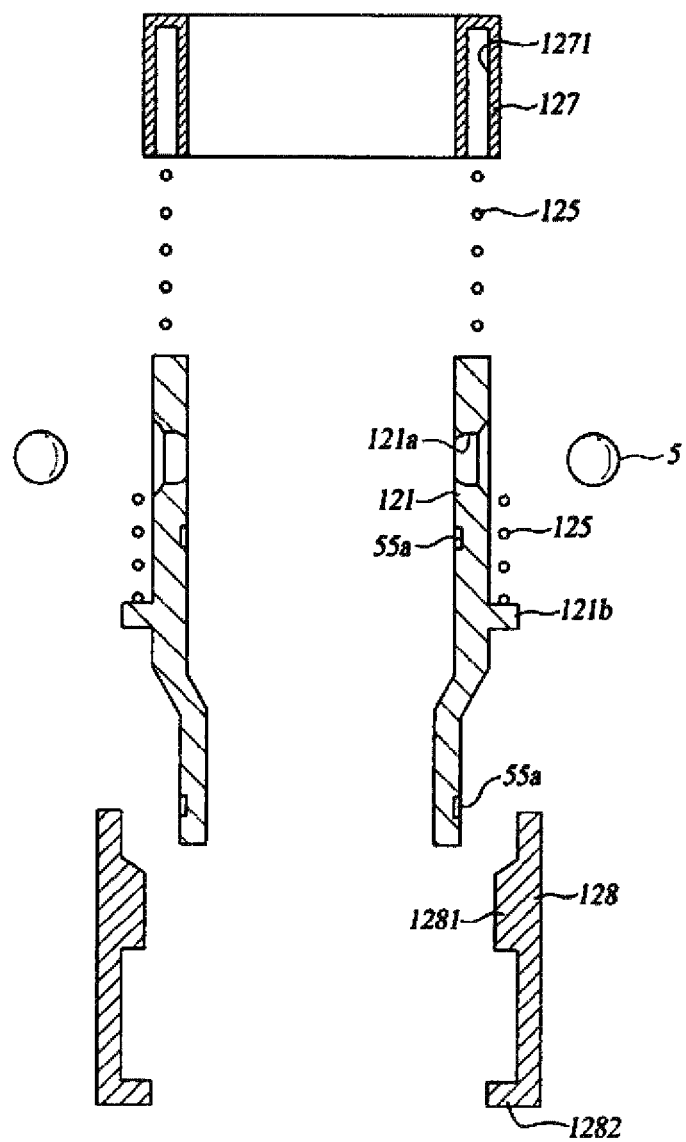

[Fig 21]
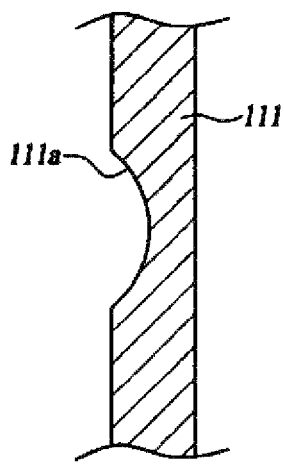
[Fig 22]
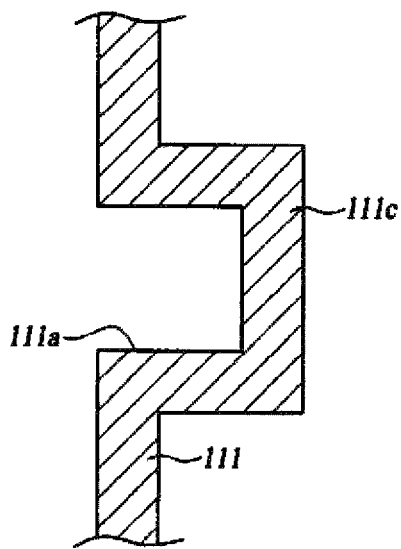

[Fig 23]
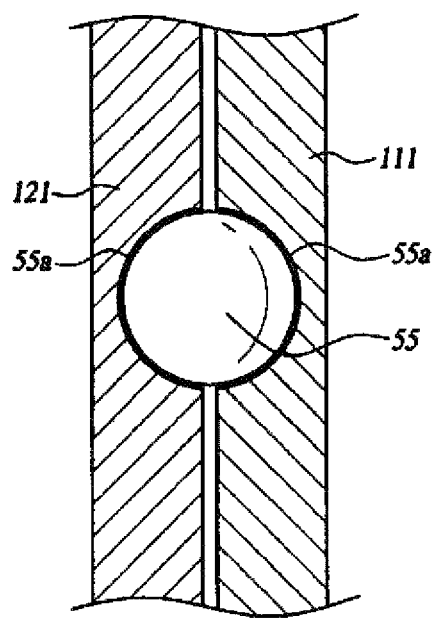

[Fig 24]
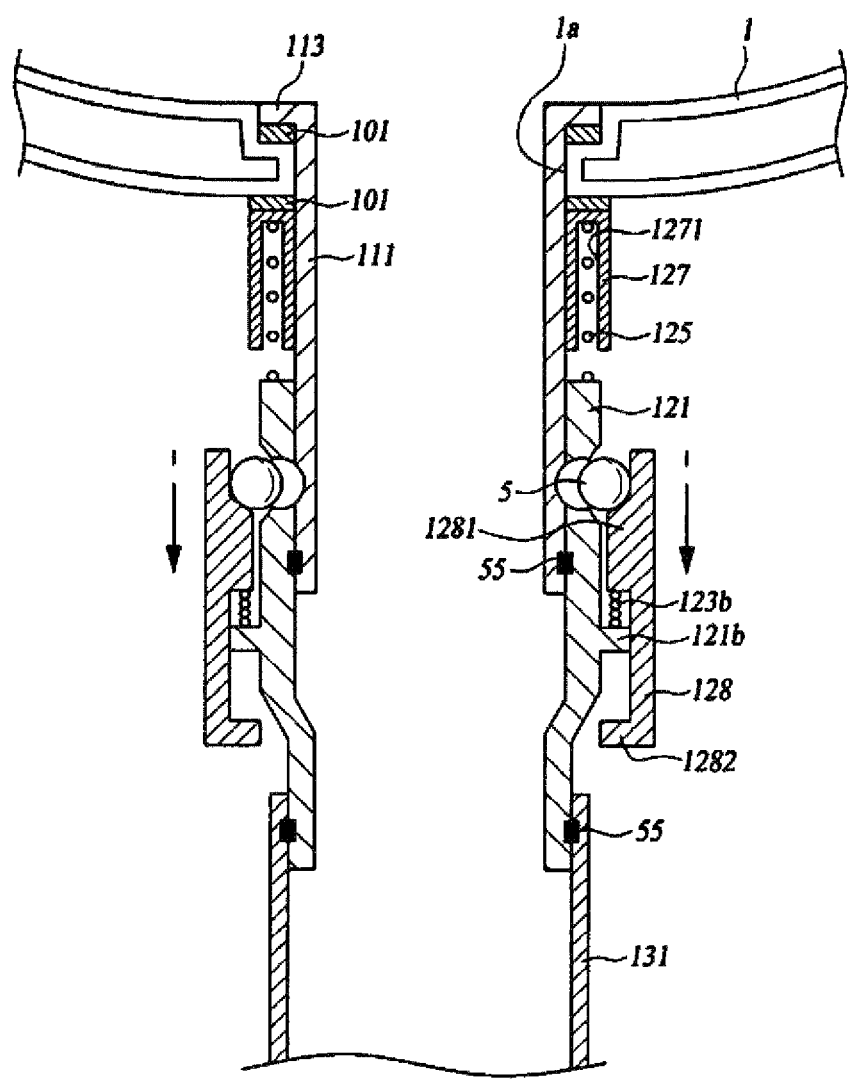

【Fig 25】
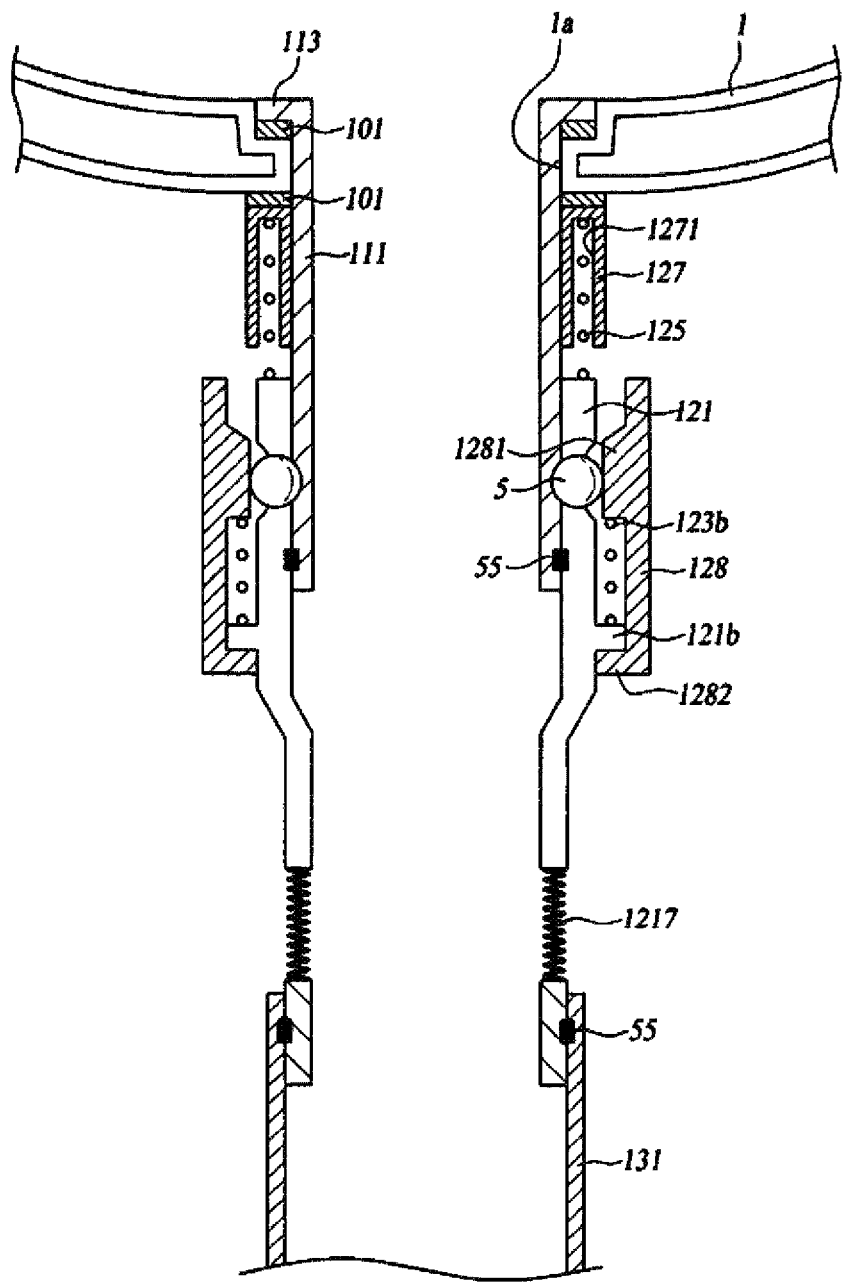

[Fig 26]
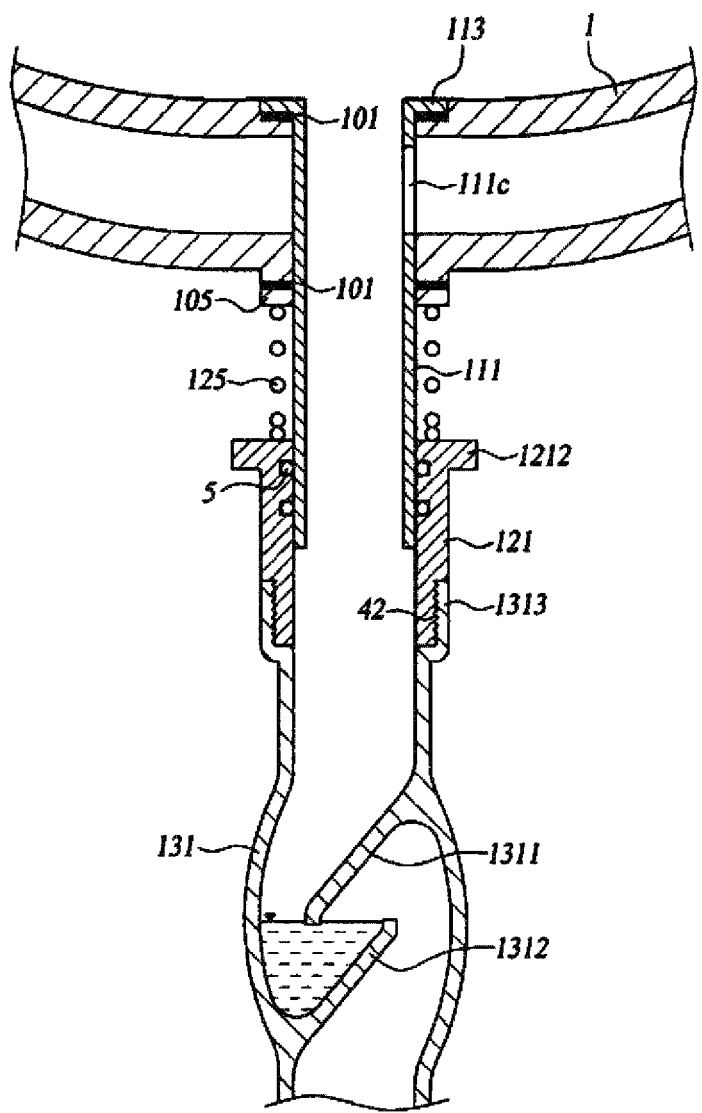

[Fig 27]
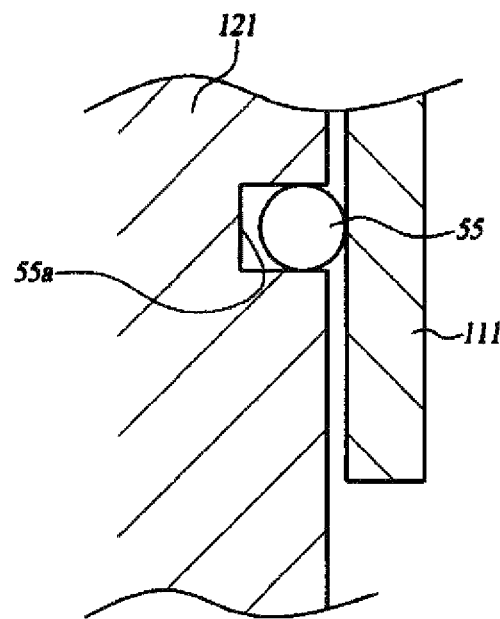
[Fig 28]
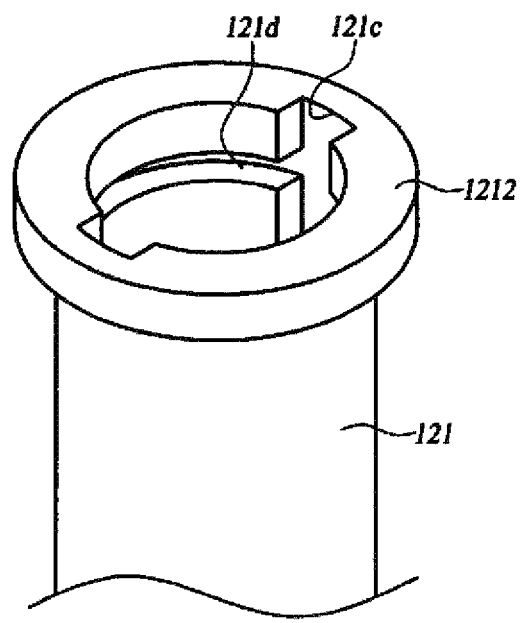

[Fig 29]
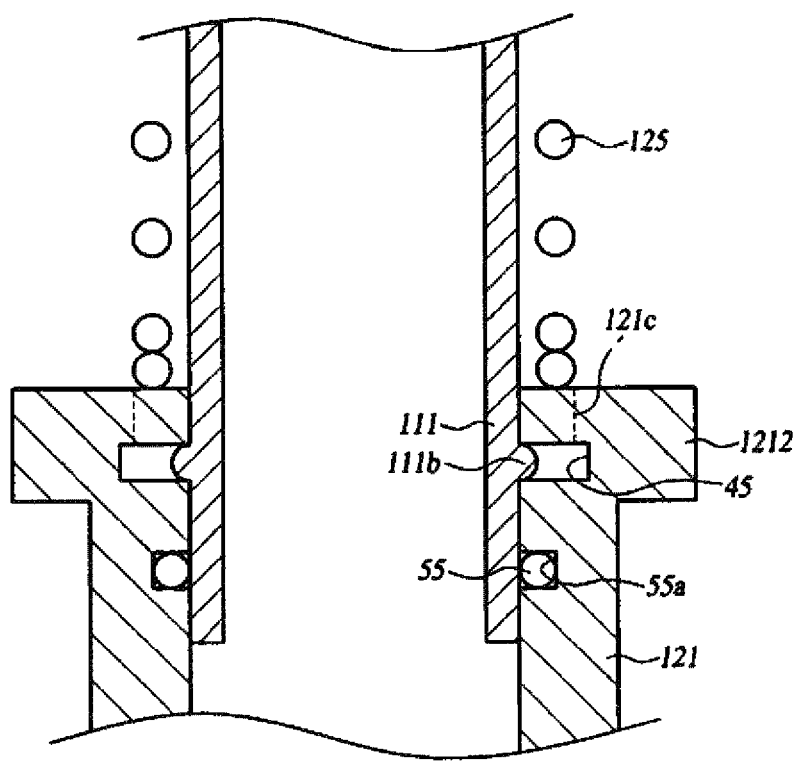

[Fig 30]
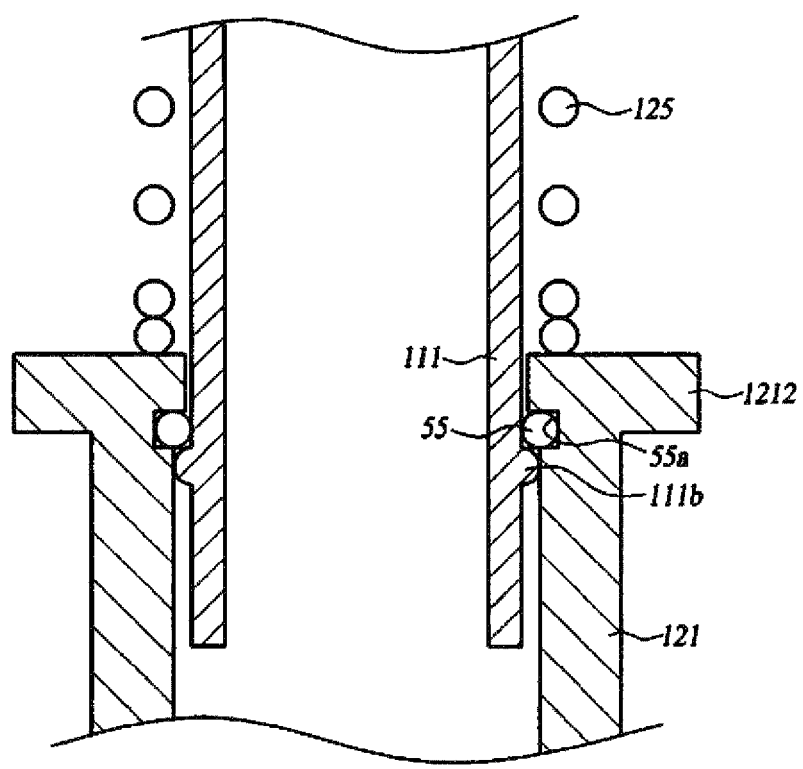

[Fig 31]
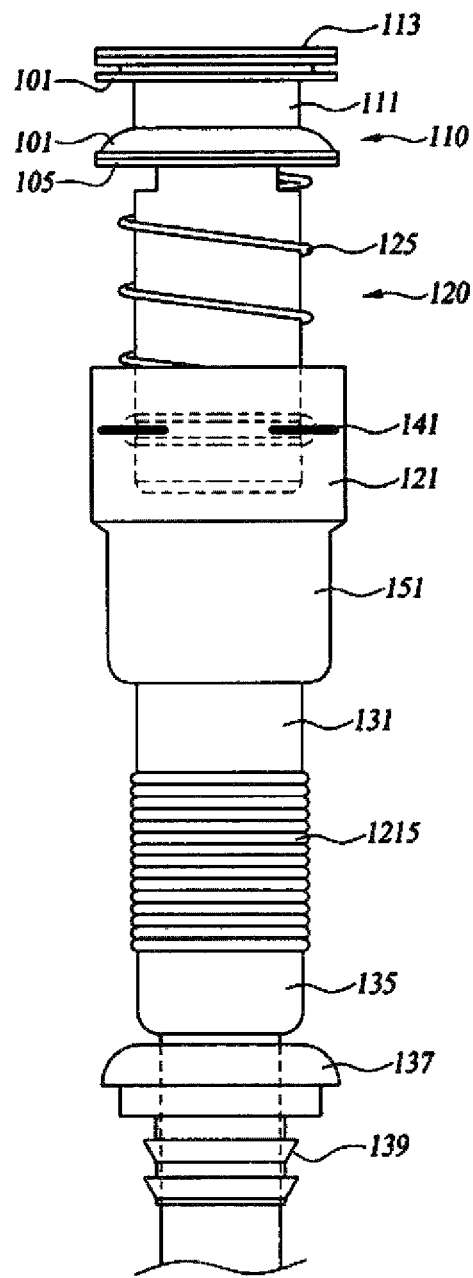

[Fig 32]
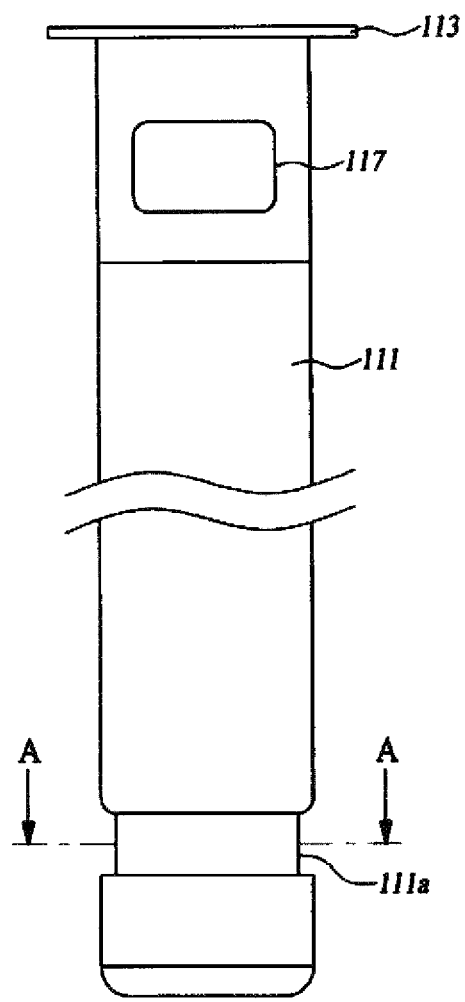

[Fig 33]
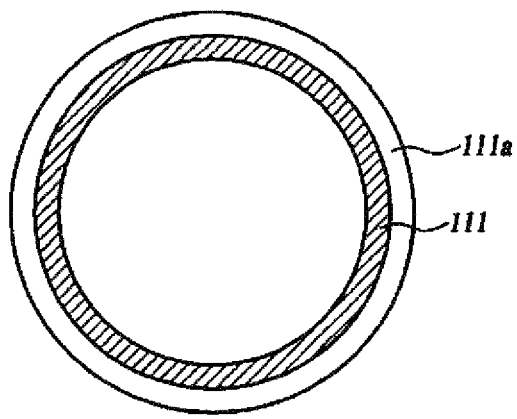
[Fig 34]
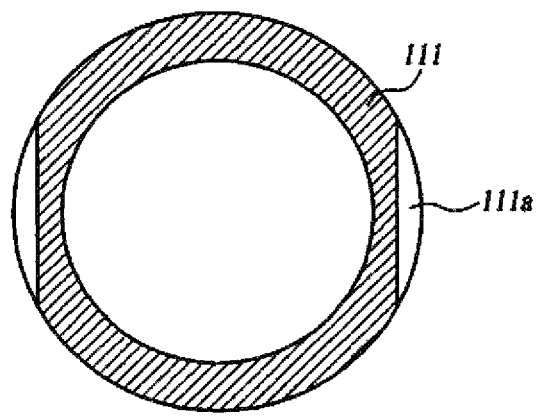

[Fig 35]
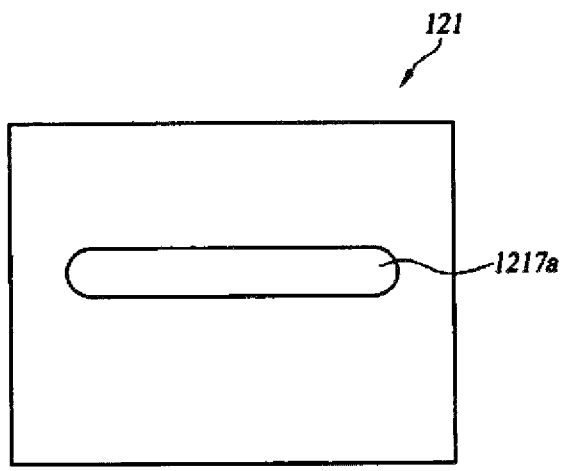
[Fig 36]
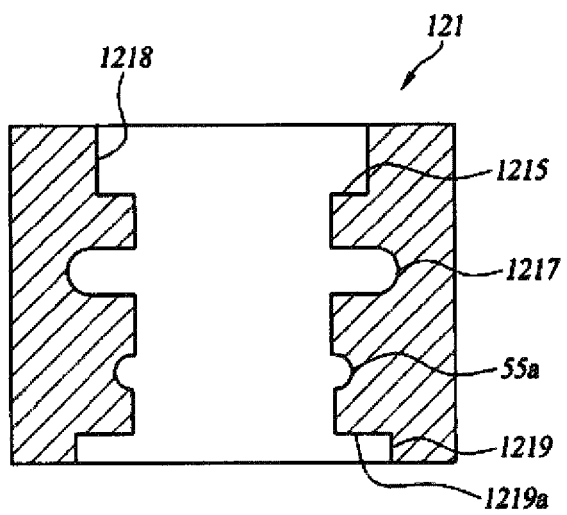

[Fig 37]
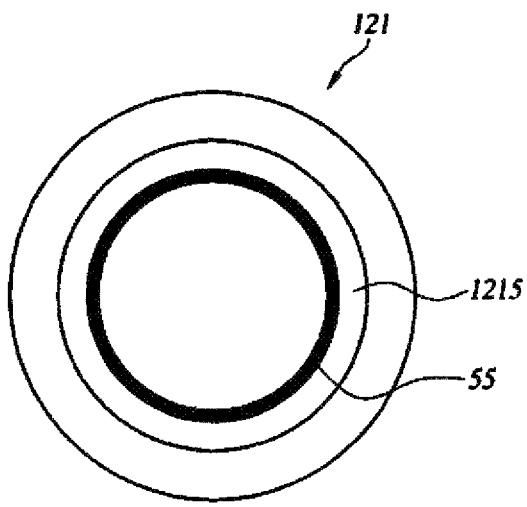
[Fig 38]
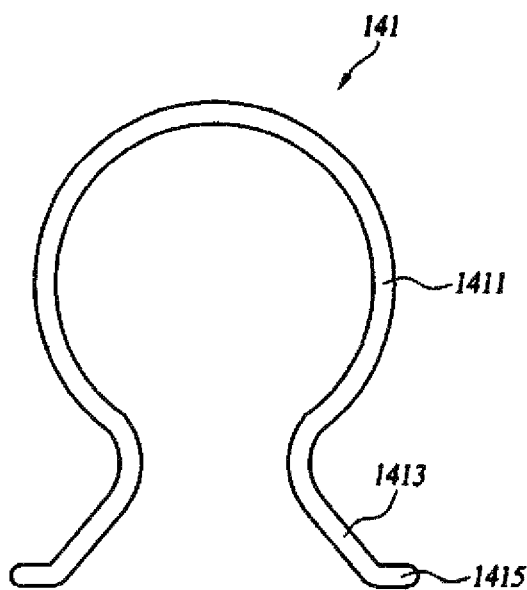

[Fig 39]
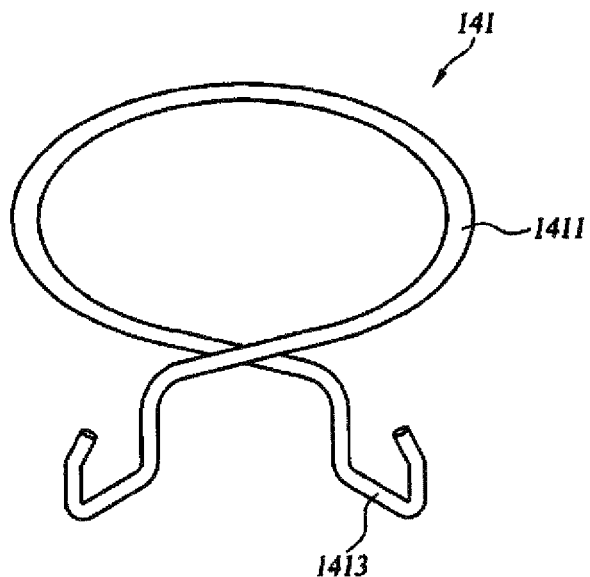
[Fig 40]
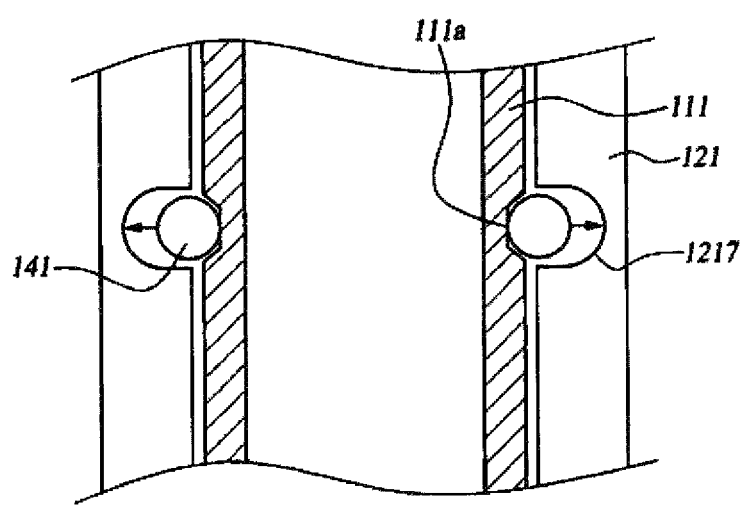

[Fig 41]
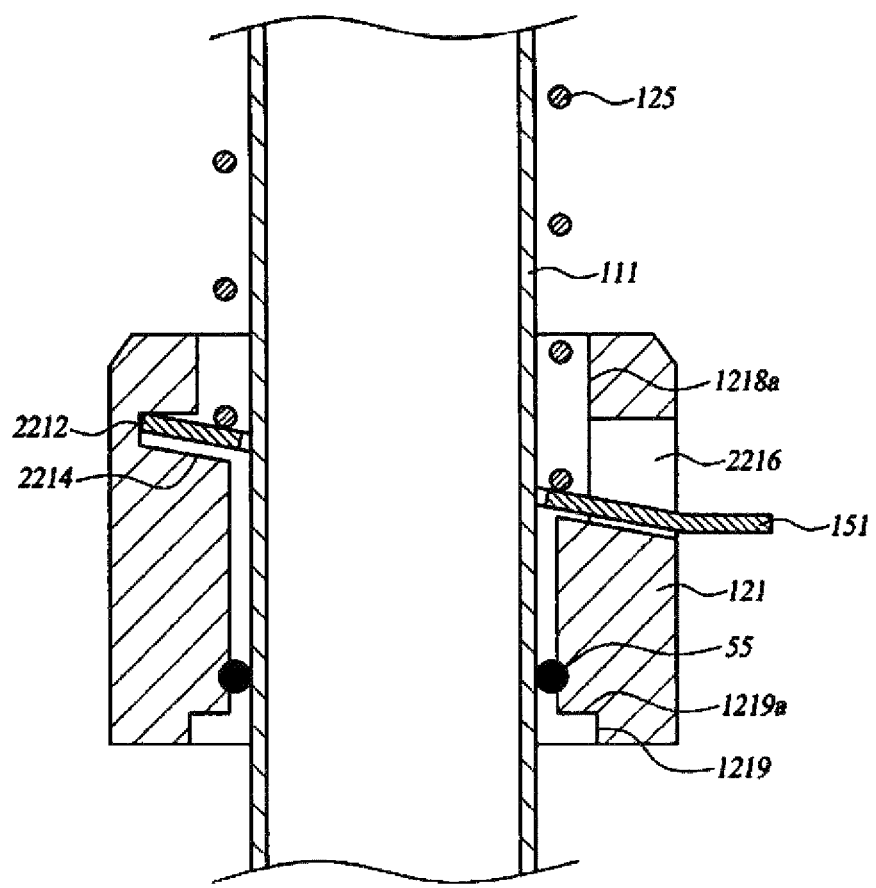

【Fig 42】
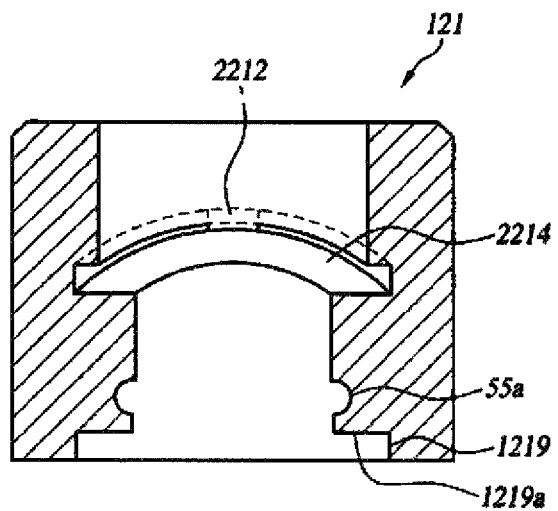
【Fig 43】
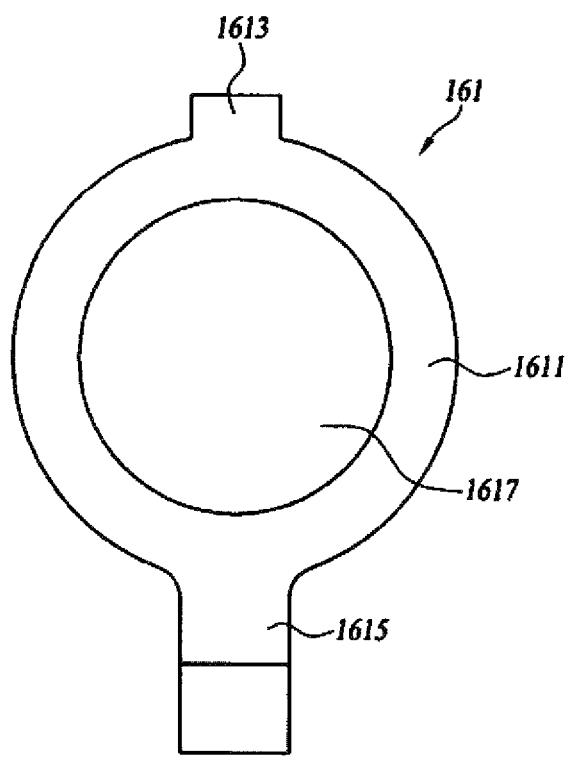

[Fig 44]
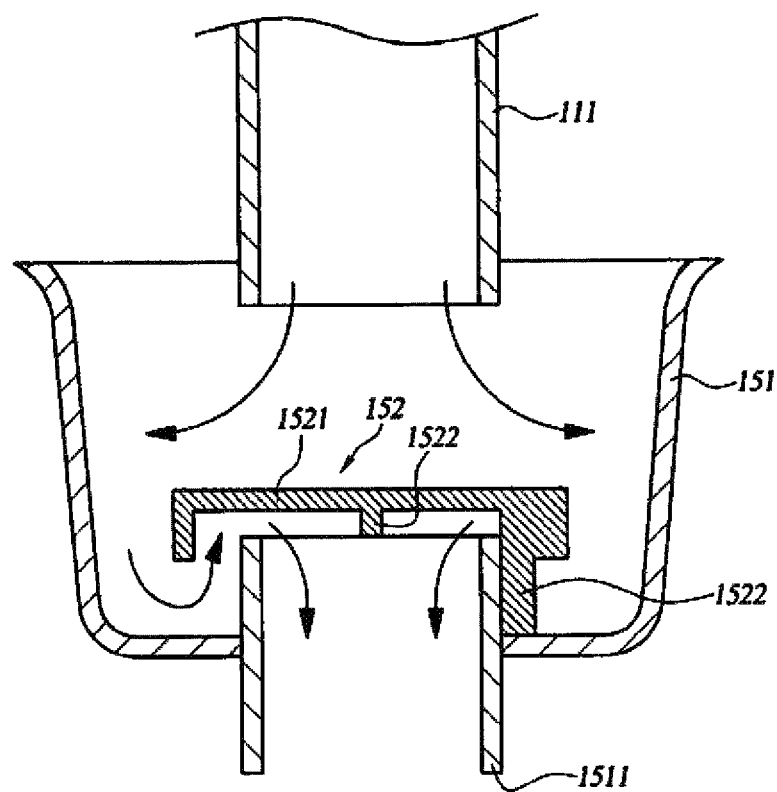
[Fig 45]
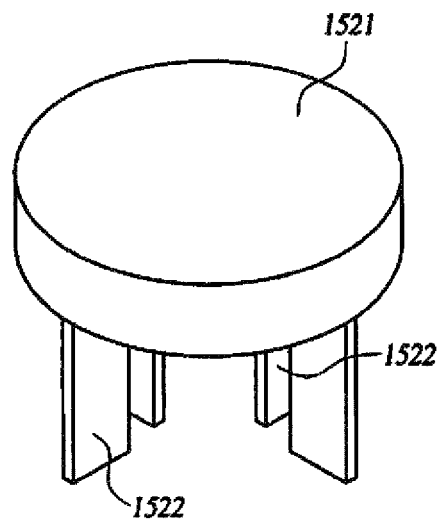

[Fig 46]
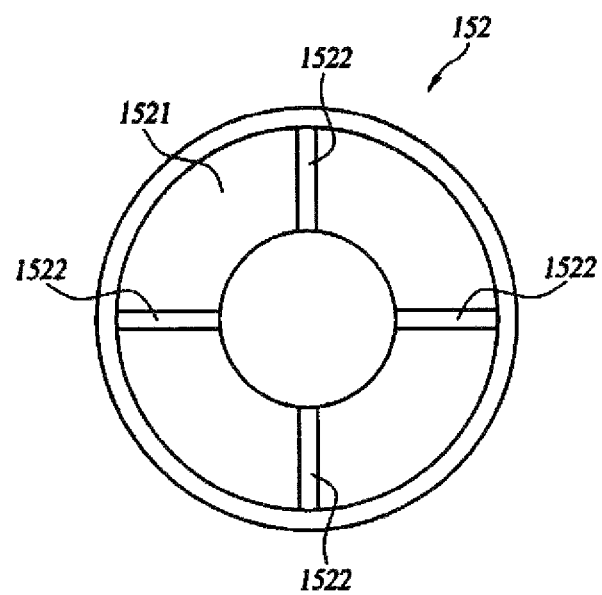

DRAIN PIPE ASSEMBLY FOR INSTALLATION OF WASHSTAND

TECHNICAL FIELD

The present invention relates to a drain pipe assembly for installation of a washstand, and, more particularly, to a drainage pipe assembly to be connected to a washstand, through which water is discharged from a basin to a drain.

BACKGROUND ART

In general, a washstand has a drain system to discharge water from a basin to a drain or the like. Korea Utility Model Publication No 20-0459796 (Apr. 25, 2012) discloses a drain system for a washstand. FIG. 1 is a cross-sectional view illustrating the drain system for the washstand according to the related art.

As illustrated in FIG. 1, the drain system for the washstand according to the related art includes a pop-up drain 10, a hose 20, and a drain pipe 30. A basin 1 is a container with an opened top to store water therein, and is provided with a through-hole in a center portion thereof, and a pop-up valve of the pop-up drain 10 is provided in the through-hole. The hose 20 is made of a flexible tube, and the drain pipe 30 is made of a metal tube, such as stainless steel, in order to connect the hose 20 and the drain 3. However, the drain system for the washstand according to the related art which is illustrated in FIG. 1 has problems in that since durability of the hose 20 is weak, the hose is easily broken, and in that the drain system is configured to give off a bad smell. Therefore, it is a recent trend to replace the whole drain pipe by a metallic material.

FIG. 2 is a cross-sectional view illustrating a drain pipe assembly for installation of a washstand according to the related art. As illustrated in FIG. 2, a drain pipe 2 is installed to the through-hole provided in a base of the basin 1, and an upper end of the drain is provided with a rim 21 that extends outwardly in a radial direction, so that the drain pipe 2 is supported by the top surface of the base of the basin 1. A packing member 22 is interposed between the rim 21 and the top surface of the base of the basin 1. Also, the drain pipe 2 is fastened to the bottom surface of the base of the basin 1 by a nut 24, and thus the drain pipe 2 is engaged to the basin 1. A packing member 22 and a washer 23 are, interposed between the nut 24 and the bottom surface of the base of the basin 1. A lower end of the drain pipe 2 is coupled to a trapping pipe 4 with a bent flow path in order to prevent gases or bad smells from being flowing backward, or alien matters or bugs from coming in.

Explaining the method of assembling and disassembling the drain pipe assembly for instillation of the washstand according to the related art, the drain pipe 2 is firstly inserted into the through-hole formed in the base of the basin 1 from an upward direction to a downward direction, the lower end of the drain pipe 2 is coupled to the upper end of the trapping pipe 4, and then the drain pipe 2 is fixed to the basin 1 by fastening the nut 24. When the drain pipe 2 is disassembled, the nut 24 is unfastened, the lower end of the drain pipe 2 is released from the upper end of the trapping pipe 4, and then the drain pipe 2 is withdrawn from the through-hole formed in the base of the basin 2, thereby completing the disassembling work.

However, the drain pipe assembly for installation of the washstand according to the related art has problems in that a special tool is required to fasten or unfasten the nut when the drain pipe is assembled or disassembled; replacing and repairing work is inconvenience, and a lot of working hours are needed.

DISCLOSURE

Technical Problem

Therefore, the present invention has been made in view of the above problems, and an object of the present invention is to provide a drain pipe assembly for installation of a washstand that can easily assemble or disassemble a drain pipe without a special tool, and can omit fastening work between the drain pipe and a trapping pipe.

Technical Solution

According to one aspect of the present invention, there is provided a drain pipe assembly for installation of a basin, including: a drain pipe which is inserted in a drain port formed in a base of basin and has a flange of which an upper end is caught by the drain port; and a fastening member which fixes the basin against the flange, wherein the fastening member pulls the drain pipe, which is exposed below the basin, in a downward direction, to upwardly press the basin, thereby fastening the basin and the drain pipe.

The fastening member includes a sliding member in which the dram pipe is slidably inserted in a longitudinal direction, a first spring member which receives the drain pipe, of which a lower end is brought into contact with the sliding member, and an upper end is brought into contact with a bottom surface of the base of the basin to resiliently press the bottom surface, and a fixing member which fixes the sliding member to the drain pipe.

The fixing member has a latch which is rotatably connected to the sliding member, and a second spring member which resilient supports the latch in a rotation direction to press the drain pipe.

An outer peripheral surface of the drain pipe is formed with a recessed groove for receiving the latch.

A lower end of the drain pipe is connected to a trapping pipe of which a trap is filled with water by a bent flow path.

A lower end of the sliding member is connected to a trapping pipe of which a trap is filled with water by a bent flow path.

The fastening member includes a sliding member in which the drain pipe exposed below the basin is slidably inserted in a longitudinal direction, a handle which is rotatably connected to the sliding member, and a link member which is rotatably connected to the handle at a position spaced apart from the position where the handle is rotatably connected to the sliding member, in which the drain pipe is formed with a recessed groove, the link member being inserted in the recessed groove and being caught by the recessed groove.

The link member has a first link member, of which an, upper end is rotatably connected to the handle, and a lower end is formed with a locking groove, and a second link member, of which an upper portion is inserted and connected to the locking groove, and a lower portion is extended toward a side of the drain pipe.

The sliding member has a guide portion formed with a slot which receives the second link member to guide the second link member sliding in, a vertical direction; a lower end of the second link member is extended towards a side of the drain pipe beyond the sliding member; and a spring member is further interposed between the second link member and an inner wall, of the guide portion to urge the second link member toward the drain pipe.

The recessed groove is formed in such a way that an upper side is inclined in an extending direction of the lower end of the second link member.

The fastening member presses a side of the drain pipe, and upwardly presses a bottom surface of the base of the basin in a longitudinal direction of the drain pipe, thereby fastening the drain pipe to the basin.

The fastening member includes a sliding member in which the drain pipe is slidably inserted in a longitudinal direction, a pressing member which is positioned above the sliding member, in which the drain pipe is slidably inserted in the longitudinal direction, a first spring member which is provided between the sliding member and the pressing member, of which one side is brought into contact with the sliding member, and the other side is brought into contact with the pressing member to press the pressing member toward the basin, and a fixing member which detachably fixes the sliding member to the drain pipe.

The sliding member is provided on the side thereof with at least one through-hole which penetrates a wall of the sliding member in a widthwise direction, and the drain pipe is formed with a recessed groove; the fixing member has a locking member having a pressing boss which protrudes from an inner surface thereof to face an outside of the sliding member, in which the sliding member is slidably inserted in the longitudinal direction, a second spring member which is provided between the sliding member and the locking member to upwardly press the locking member, and a ball member which is seated in the through-hole formed in the sliding member; the pressing boss of the locking member inwardly presses the ball member in a widthwise direction, and the ball member is inwardly exposed through the through-hole and then is seated in the recessed groove, so that the sliding member is fastened to the drain pipe; and the first spring member presses the pressing member in an upward direction, so that the drain pipe is fastened to the basin.

The locking member has a stopper boss which is positioned below the pressing boss and protrudes inwardly from the locking member in a widthwise direction, and the sliding member has a seating boss which is positioned below the through-hole and is extended outwardly in the widthwise direction; and the seating boss is positioned between the stopper boss and the pressing boss in the longitudinal direction, and an end of the seating boss is positioned outer than an end of the stopper boss in the widthwise direction.

A widthwise distance from an inner end of the recessed groove to an inner end of the pressing boss is larger than a diameter of the ball member, and a widthwise distance from an outer surface of the drain pipe to the inner end of the pressing boss is smaller than the diameter of the ball member.

The fastening member has a trapping portion having a sliding member, and a first spring member which is provided between the sliding member and the basin, in which the drain pipe is inserted; and the first spring member is compressed between the sliding member and the basin.

The sliding member is engaged to the drain pipe by an interference-fitting manner.

The sliding member is threadedly engaged to the drain pipe.

An O-ring is further provided between the sliding member and the drain pipe; the drain pipe is formed with a recessed groove, and the O-ring is positioned in the recessed groove; and the sliding member is engaged to the O-ring by an interference-fitting manner.

The drain pipe is provided with a locking boss which protrudes towards the O-ring; when the sliding member is engaged to the drain pipe, the O-ring is expanded while the locking boss passes the O-ring, and the locking boss is positioned below the O-ring to support the O-ring.

The sliding member is formed with a fitting groove which extends downwardly from the upper end in the longitudinal direction, and a locking groove which is formed in the circumferential direction below the upper end, of which an end is connected to the fitting groove; the drain pipe is provided with a locking boss protruding from an outer peripheral surface thereof; and the locking boss is slid along the fitting groove of the sliding member, and then is slid along the locking groove until the locking boss is locked to the locking groove, thereby the sliding member is engaged to the drain pipe.

The sliding member is a coupling for a hydraulic hose, and the drain pipe is formed with a groove; and the sliding member and the drain pipe are connected to each other by coupling engagement.

The fastening member includes a sliding member in which the drain pipe exposed below the basin is slidably inserted, a clamp member which is positioned between the sliding member and the drain pipe to clamp the drain pipe and thus hold the sliding member, and a first spring member which receives the drain pipe in a vertical direction and is provided between the basin and the sliding member to downwardly press the sliding member.

The sliding member is made of a hollow body, through which the drain pipe is slidably inserted, and is formed with a lateral slit, through which the clamp member protrudes.

An outer peripheral surface of the drain pipe is formed with a recessed groove, and the clamp member is fitted to the recessed groove; the clamp member has an arc-shaped portion which is positioned in the recessed groove, and grip portions which are extended from both ends of the arc-shaped portion and are exposed outwardly from the lateral slit.

The fastening member includes a sliding member having an inclined washer shoulder, in which the drain pipe is slidably inserted, a clamp washer which is brought into contact with the washer shoulder and is pivotally moved in the sliding member, in which the drain pipe is fitted, and a first spring member which is positioned between the basin and the clamp washer to downwardly presses the clamp washer, and the sliding member, in which the drain pipe is inserted in the vertical direction.

The fastening member includes a sliding member in which the drain pipe is slidably inserted, the sliding member having an inclined washer shoulder, a pivot portion which is configured to receive a protrusion of the clamp washer seated on the washer shoulder so that the protrusion is pivotally moved, and a clearance hole which penetrates the sliding member in a lateral direction at a position opposite to the pivot portion.

A lower end of the sliding member is connected to an upper end of an upper coupler; the upper coupler is made of a hollow body in which the drain pipe can be inserted, and a lower end of the upper coupler is provided with a connecting extension which is extended in a vertical direction on the basis of the lower end; and a trapping cover is fitted to an upper portion of the connecting extension.

The trapping cover has a plate-shaped cover and a cover support which is extended downwardly from a bottom surface of the cover; and the cover support is engaged to an outer peripheral surface of the upper end of the connecting extension to support the cover.

When the trapping cover is engaged to the connecting extension, a space, through which a fluid flows, is formed between the bottom surface of the cover and the upper portion of the connecting extension.

Advantageous Effects

With the above configuration, anyone can easily assemble or disassemble the drain pipe assembly for installation of the basin according to the present invention, without using special tools, and it is possible to shorten the working time. In addition, if the trapping pipe is integrally formed, it is possible to further reduce the number of assembling steps.

DESCRIPTION OF DRAWINGS

FIG. 3 is a perspective view illustrating a drain pipe assembly for installation of a washstand according to the present invention.

FIG. 4 is an exploded perspective view illustrating the drain pipe assembly for installation of the washstand according to the present invention.

FIG. 5 is a cross-sectional view illustrating the drain pipe assembly for installation of the washstand according to the present invention.

FIG. 6 is a partially cross-sectional view of a fixing member of the drain pipe assembly for installation of the washstand according to the present invention.

FIG. 7 is a view illustrating a state in which the drain pipe assembly for installation of the washstand according to the present invention is disassembled from a basin.

FIG. 8 is a view illustrating a state in which the drain pipe assembly for installation of the washstand according to the present invention is assembled on the basin.

FIG. 9 is a cross-sectional view illustrating a drain pipe assembly for installation of the washstand according to a variant of the present invention.

FIG. 10 is a view illustrating a state in which a drain pipe of the drain pipe assembly for installation of the washstand according to the variant of present invention is released from a fastening member.

FIG. 11 is an enlarged cross-sectional view illustrating a fixing member of the drain pipe assembly for installation of the washstand according to the variant of present invention.

FIG. 12 is a perspective view illustrating a drain pipe assembly for installation, of a washstand according to another embodiment of the present invention.

FIG. 13 is an exploded perspective view illustrating the drain pipe assembly for installation of the washstand according to another embodiment of the present invention.

FIG. 14 is a cross-sectional view illustrating the drain pipe assembly for installation of the washstand according to another embodiment of the present invention.

FIG. 15 is a perspective view illustrating a portion of a fastening member of the drain pipe assembly for installation of the washstand according to another embodiment of the present invention.

FIG. 16 is an enlarged cross-sectional view illustrating the fastening member of the drain pipe assembly for installation of the washstand according to another embodiment of the present invention.

FIG. 17 is a perspective view illustrating an operating state of the drain pipe assembly for installation of the washstand according to another embodiment of the present invention.

FIG. 18 is a cross-sectional view illustrating a state in which the drain pipe assembly for installation of the washstand according to another embodiment of the present invention is installed on a basin.

FIG. 19 is a cross-sectional view illustrating a drain pipe assembly for installation of the washstand according to further another embodiment of the present invention.

FIG. 20 is an exploded cross-sectional view illustrating the drain pipe assembly for installation of the washstand according to further another embodiment of the present invention.

FIG. 21 is a cross-sectional view of the circle A in FIG. 19.

FIG. 22 is a cross-sectional view of a variant of FIG. 21.

FIG. 23 is a cross-sectional view of the circle B in FIG. 19.

FIG. 24 is a cross-sectional view illustrating an operating example of the drain pipe assembly for installation of the washstand according to further another embodiment of the present invention.

FIG. 25 is a cross-sectional view illustrating an operating example of the drain pipe assembly for installation of the washstand including a modified sliding member according to further another embodiment of the present invention.

FIG. 26 is a cross-sectional view illustrating the drain pipe assembly for installation of the washstand including an interference-fit fastening member according to the present invention.

FIG. 27 is an enlarged cross-sectional view illustrating a coupling portion and a drain pipe in the drain pipe assembly for installation of the washstand according to the present invention in FIG. 26.

FIG. 28 is a perspective view illustrating a coupling portion of the drain pipe assembly for installation of the washstand according to a variant of FIG. 26.

FIG. 29 is an enlarged cross-sectional view illustrating the coupling portion and a drain pipe in the drain pipe assembly for installation of the washstand according to a variant of FIG. 26.

FIG. 30 is an enlarged cross-sectional view illustrating a coupling portion and a drain pipe in a drain pipe assembly for installation of a washstand according to another variant of FIG. 26.

FIG. 31 is a front view illustrating the drain pipe assembly for installation of the washstand including a clamp fastening member according to the present invention.

FIG. 32 is a front view of the drain pipe in FIG. 31.

FIG. 33 is a cross-sectional view taken along the line A-A in FIG. 32.

FIG. 34 is a diagram of a variant of FIG. 33.

FIG. 35 is a front view illustrating a sliding member of the drain pipe assembly in FIG. 31.

FIG. 36 is a cross-sectional view taken along a longitudinal direction of the sliding member in FIG. 35.

FIG. 37 is a plan view illustrating, the sliding member in FIG. 35.

FIG. 38 is a plan view illustrating a clamp member which is one example of the clamp fastening member according to the present invention.

FIG. 39 is a perspective view of a variant of FIG. 38.

FIG. 40 is a cross-sectional view illustrating a state in which the drain pipe and the sliding member are coupled to each other by the clamp member of the drain pipe assembly for installation of the washstand in FIG. 31.

FIG. 41 is a partially cross-sectional view illustrating the coupling state of the drain pipe and the sliding member in the drain pipe assembly for installation of the washstand in FIG. 36.

FIG. 42 is a cross-sectional view taken along a longitudinal direction of the sliding member in FIG. 41.

FIG. 43 is a plan view illustrating a clamp washer of the drain pipe assembly for installation of the washstand in FIG. 41.

FIG. 44 is a cross-sectional view of an upper coupling pipe in FIG. 31.

FIG. 45 is a perspective view of a trapping cover in FIG. 44.

FIG. 46 is a bottom view of the trapping cover.

MODE FOR INVENTION

Figure 1:
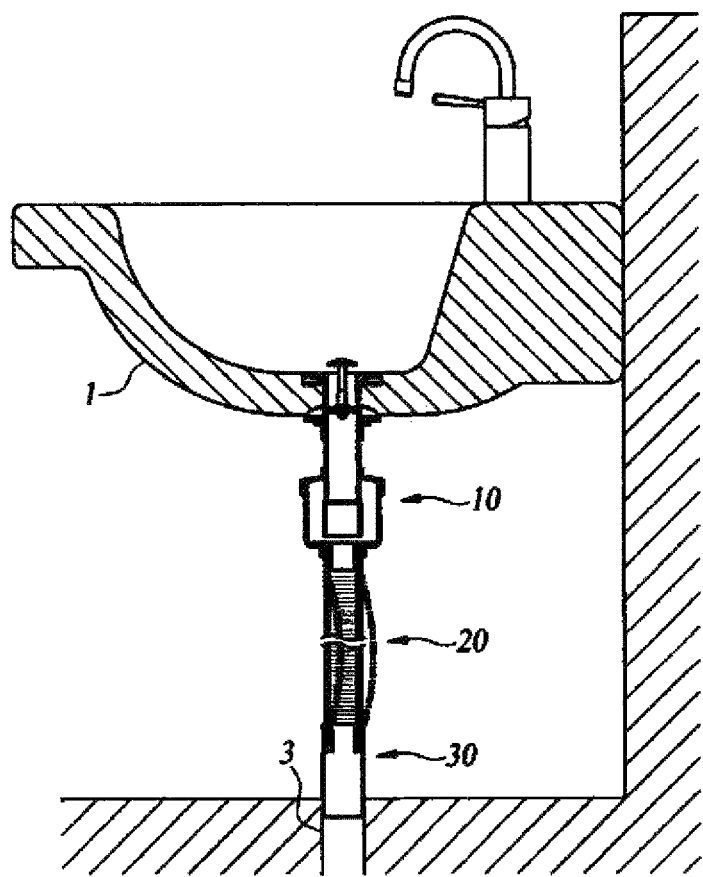
FIGS. 1 and 2 are cross-sectional views illustrating a drain system for a washstand according to the related art.

The configuration of a drain pipe assembly for installation of a washstand according to embodiments of the present invention will be hereafter described in detail with reference to the accompanying drawings.

FIG. 3 is a perspective view illustrating a drain pipe assembly for installation of a washstand according to the first embodiment. FIG. 4 is an exploded perspective view illustrating the drain pipe assembly for installation of the washstand according to the first embodiment. FIG. 5 is a cross-sectional view illustrating the drain pipe assembly for installation of the washstand according to the first embodiment. FIG. 6 is a partially cross-sectional view of a fixing member of the drain pipe assembly for installation of the washstand according to the first embodiment. FIG. 7 is a view illustrating a state in which the fixing member of the drain pipe assembly for installation of the washstand according to the first embodiment is released. FIG. 8 is a view illustrating a state in which the drain pipe assembly for installation of the washstand according to the first embodiment is assembled on the basin.

As illustrated in FIGS. 3 to 8, a drain pipe assembly 100 for installation of a washstand according to the first embodiment of the present invention includes a drain pipe 111 and a fastening member. The fastening member is configured to press a bottom surface of a base of a basin 1 and pull downwardly a tubular body of a pipe extending to a lower portion of a flange 113, and includes a sliding member 121, a washer 105, a first spring member 125, and a fixing member. The fastening member resiliently presses the bottom surface of the base of the basin 1 in a longitudinal direction of the drain pipe 111, and pulls downwardly the drain pipe 111, so that the drain pipe 111 is fixed to the basin 1. In other words, the drain pipe 111 is fixed to the basin 1 by the fastening member.

The drain pipe 111 is formed in an extended tubular shape, and has a flange 113 at an upper portion. The flange 113 is radially outwardly extended from an upper end thereof when seen from the longitudinal direction of the drain pipe 111, and thus is seated on a circumference of a drain port, formed in the basin to be flush with a top surface of the base of the basin 1. A lower end of the drain pipe 111 extends downwardly through the drain port formed in the basin 1. The drain pipe 111 is installed to the basin 1 in such a way that the flange 113 is caught by the drain port formed in the base of the basin 1 and extends downwardly through the drain port.

A recessed groove 111a is formed on an outer peripheral surface of the drain pipe 111. The recessed groove 111a is located at a position downwardly away from the flange 113 so that it is exposed from a lower portion of the basin 1 when the drain pipe 111 is inserted in the drain port. Pairs of recessed grooves 111a may be provided which are vertically spaced apart from each other in the longitudinal direction of the drain pipe 111. A latch 123 which will be described hereinafter is inserted in the recessed groove 111a.

The sliding member 121 is formed in a hollow tubular shape, and the drain pipe 111 is inserted in the sliding member 121. The sliding member 121 is inserted from the lower end of the drain pipe 111 so as to be slidably movable in the longitudinal direction of the drain pipe 111. The sliding member 121 has a tubular portion 1211 which is fitted onto the drain pipe 111, a grip portion 1212 radially protruding from the tubular portion 1211, and a rotational support portion 1213 onto which the latch 123 is rotatably assembled. The grip portion 1212 is easily gripped by a hand of an installer when the sliding member 121 is slid. The grip portion 1212 is formed in an annular shape.

The inside of the tubular portion 1211 is provided with a seat portion 1215 that is a shoulder portion inwardly protruding from the inside to support the lower end of a first spring member 125 which will be described hereinafter. The side of the tubular portion 1211 is provided with a groove portion 1214 to receive the latch 123. The tubular portion 1211 may be extended downwardly beyond the grip portion 1212, so that the groove portion 1214 may be formed on the tubular portion 1211 at a lower portion of the grip portion 1212.

The groove portion 1214 is, formed to penetrate the side of the tubular portion 1211. The seat portion 1215 protrudes inwardly to form a shoulder inwardly protruding from the tubular portion 1211, and the tubular portion 1211 has an inner diameter larger than an outer diameter of the drain pipe 121, so that the first spring member 125 is supported by the seat portion 1215, with the first spring member being interposed between the outside of the drain pipe 111 and the inside of the tubular portion 1211. The inner surface of the seat portion 1215 has an inner diameter larger than the outer diameter of the drain pipe 111. The tubular portion 1211 is not limited to the circular cross section, and it is not necessary to make the cross section of the tubular portion with a closed tube. If the tubular portion 1211 is made of a pipe, the grip portion 1212 can be provided as a protrusion radially protruding from the tubular portion 1211. The compression degree of the first spring member 125 can be limited by the distance between the seat portion 1215 and the upper end of the tubular portion 1211.

The washer 105 is formed of a disc-type ring to receive the drain pipe 111, and can slide in the longitudinal direction of the drain pipe 111. The washer 105 supports the bottom surface of the base of the basin 1, and the basin 1 is pressed and, fixed between the support portion 113 and the washer 105. A packing 101 for preventing leakage is interposed between the support portion 113 and the top surface of the base of the basin 1. The drain pipe 111 is inserted into the packing 101. The packing 101 may be interposed between the bottom surface of the base of the basin 1 and the washer 105.

The first spring member 125 is made of a coil spring, of which a lower end is supported by the seat portion 1215 of the sliding member 121, while an upper end is supported by the washer 105. The upper end of the first spring member 125 can be brought into direct contact with the bottom surface of the base of the basin 1, without having washer 105.

The first spring member 125 resiliently presses the washer 105 against the bottom surface of the base of the basin 1, The fixing member is configured to fix the sliding member 121 to the drain pipe 111, and includes the latch 123 and a second spring member 123a.

The latch 123 is rotatably connected at one side to the rotational support portion 1213 by a hinge shaft 1231 which is a pivot shaft. The rotational support portion 1213 is formed as a protrusion outwardly protruding from the sliding member 121, and is connected to a lower portion of the grip portion 1212 and the outside of the tubular portion 1211.

The latch 123 is rotatable around the hinge shaft 1231 with respect to the sliding member 121, and an axial direction of the hinge shaft 1231 is perpendicular to the longitudinal direction of the drain pipe 111. It is preferable that a pair of latches 123 is provided at opposite positions of the sliding member 121. The number of the latches can be increased or decreased if necessary. The latch 123 is provided with an inclined point portion 1233 at a position spaced apart from the hinge shaft 1231 in a radius of rotation. The point portion 1233 is inserted in the recessed groove 11a formed on the drain pipe 111, and thus the sliding member 121 is fixed to the drain pipe 111 in the longitudinal direction thereof. The point portion 1233 moves beyond the groove portion 1214 formed on the side of the tubular portion 1211, and then is inserted in the recessed groove 111a. The groove portion 1214 is formed to have a cross section of which a top surface is inclined upwardly, while a bottom surface is horizontal or inclined upwardly. The point portion 1233 is formed in such a way that a top surface is inclined in a state in which the point portion is inserted in the groove portion 1214.

The second spring member 123a resiliently presses the latch 123 in a rotation direction so that the latch 123 presses the drain pipe 111. The second spring member 123a is made of a torsion spring, and is engaged to the hinge shaft 1231 to press the latch 123 toward the drain pipe 111. The second spring member 123a has one extension which is brought into contact with the grip portion 1212, and the other extension which is brought into contact with the latch 123.

The retracting direction of the latch 123 corresponds to a rotation direction of the latch 123 by which the point portion 1233 of the latch 123 presses the outer peripheral surface of the drain pipe 111. The second spring member 123a resiliently supports the latch 123 in the direction to press the drain pipe 111. When the sliding member 121 is slid along the longitudinal direction of the drain pipe 111, if the latch 123 arrives at the position opposite to the recessed groove 111a, the latch 123 is inserted into the recessed groove 111a by the pressing force of the second spring member 123a, and thus the sliding member 121 is fixed to the drain pipe 111.

The lower end of the drain pipe 111 is coupled to the trapping pipe. The trapping pipe is to collect the water in a trap with a bent flow path, thereby preventing gases or bad smells from being flowing backward, or alien matters or bugs from coming in.

With the above-described configuration of the drain pipe assembly 100 for installation of the washstand according to the first embodiment of the present invention, when the drain pipe assembly is installed to the basin 1, the drain pipe 111 is first inserted into the drain port from the upward direction to the downward direction, and then the lower end of the drain pipe this fitted or screwed to the trapping pipe. Then, the sliding member 121 is upwardly slid until the latch 123 is caught by the recessed groove 111a. When the latch 123 is caught by the recessed, groove 111a, the second spring member 123a presses the latch 123 in the direction to insert the latch to the recessed groove 111a. And thus, the sliding member 121 is not further slid in the longitudinal direction of the drain pipe 111, and is retained in a fixed state. The first spring member 125 interposed between the sliding member 121 and the washer 105 presses the washer 105 toward the support portion 113 of the drain pipe 111, that is, the upper portion, by the resiliently restoring force, so that the drain pipe 111 is completely fixed to the basin 1.

On the contrary, when the drain pipe assembly 100 for installation of the washstand according to the first embodiment of the present invention is disassembled from the basin 1, the latch 123 is rotated to spread both ends thereof, and the latch 123 is released from the recessed groove 111a. And then, the sliding member 121 is released from the drain pipe 111 by the first spring member 125, and thus the drain pipe 111 is in a free state from the basin 1. The lower end of the drain pipe 111 is separated from the trapping pipe, and the drain pipe 111 is separated from the drain port of the basin 1 from the downward direction to the upward direction.

FIG. 9 is a cross-sectional view illustrating a drain pipe assembly for installation of the washstand according to the second embodiment of the present invention. FIG. 10 is a view illustrating the state in which the drain pipe of the drain pipe assembly for installation of the washstand according to the second embodiment of present invention is released from a fastening member. FIG. 11 is a view illustrating the state in which a fixing member of the drain pipe assembly for installation of the washstand according to the second embodiment of present invention is mounted to the basin. Comparing the second embodiment illustrated in FIGS. 9 to 11 and the first embodiment, the structure of the trapping pipe and the coupling structure between the drain pipe and the trapping pipe are different. Therefore, same reference numerals are used for the similar parts, and the description thereof will be omitted.

Referring to FIGS. 9 to 11, the drain pipe assembly 100 for installation of the washstand according to the second embodiment of present invention includes a drain pipe 111, a fastening/trapping module 7, a washer 105, a first spring member 125, a latch 123, and a second spring member 123a. The fastening/trapping module 7 has a sliding member 121 and a trapping pipe 131, and the sliding member 121 and the trapping pipe 131 are integrally formed.

The drain pipe 111 is formed in an extended tubular shape, and has a flange 113 at an upper portion. The flange 113 is radially outwardly extended from an upper end thereof when seen from the longitudinal direction of the drain pipe 111, and thus is seated on a circumference of a drain port formed in the basin to be flush with a top surface of the base of the basin 1. A lower end of the drain pipe 111 is inserted into the drain port formed in the basin 1, and is suspended from the basin 1 by the support portion 113. A pair of recessed grooves is formed on an outer peripheral surface of the drain pipe 111. Pairs of recessed grooves may be provided which are vertically spaced apart from each other in the longitudinal direction of the drain pipe 111. A latch 123 which will be described hereinafter is inserted in the recessed groove 111a.

The sliding member 121 is formed in a hollow tubular shape, and the drain pipe 111 is inserted in the sliding member 121, so that the sliding member 121 is slidably movable in the longitudinal direction of the drain pipe 111.

The washer 105 is formed of a disc-type ring to receive the drain pipe 111, and can slide in the longitudinal direction of the drain pipe 111. The washer 105 supports the bottom surface of the base of the basin 1, and the basin 1 is retained between the support portion 113 and the washer 105. The first spring member 125 is made of a compressed coil spring, of which a lower end is supported by the sliding member 121, while an upper end is supported by the washer 105. The first spring member 125 resiliently presses the washer 105 against the bottom surface of the base of the basin 1.

The latch 123 is rotatably connected at one side to the sliding member 121. The latch 123 is rotatable around the hinge shaft with respect to the sliding member 121, and an axial direction of the hinge shaft is perpendicular to the longitudinal direction of the drain pipe 111. The second spring member 123a resiliently presses the latch 123 in a rotation direction so that the latch 123 presses the drain pipe 111. The second spring member 123a has the same configuration as the above-described embodiment and thus the detailed description will be omitted hereinafter.

The trapping pipe 131 is formed integrally with the lower portion of the sliding member 121. The trapping pipe 131 is formed in a straight shape in the longitudinal direction thereof, and has a first partition 1311 and a second partition 1312 therein. The first partition 1311 is downwardly extended at an angle from the upper portion, while the second partition 1312 is upwardly extended at an angle from a lower portion. The inclined directions of the first partition 1311 and the second partition 1312 are parallel with each other. The water is collected by a trapping flow path which is formed between the first partition 1311 and the second partition 1312. Specifically, with the configuration of the first partition 1311 and the second partition 1312, the inside of the trapping pipe 131 is provided with a U-shaped bent flow path. The bent flow path provides the trapping flow path to collect the water therein, thereby preventing gases or bad smells from being flowing backward, or alien matters or bugs from coming in.

Since the trapping pipe 131 is formed integrally with the sliding member 121, it is possible to reduce the number of assembling processes. In addition, the space occupied by the trapping pipe can be reduced by the straight structure of the trapping pipe 131 and the structure of the trapping flow path which is formed in the trapping pipe 131, and the trapping pipe 131 can be easily assembled or disassembled.

With the above-described configuration of the drain pipe assembly 100 for installation of the washstand according to the second embodiment of the present invention, when the drain pipe assembly is installed to the basin 1, the drain pipe 111 is first inserted into the drain port of the basin 1 from, the upward direction to the downward direction, and then the fastening/trapping module 7, of which the sliding member 121 and the trapping pipe 131 are integrally formed, is upwardly slid until the latch 123 is caught by the recessed groove 111a. When the latch 123 is caught by the recessed groove, the second spring member 123a presses the latch 123 in the direction to insert the latch 123 to the recessed groove 111a. And thus, the fastening/trapping module 7 is not further slid in the longitudinal direction of the drain pipe 111, and is retained in a fixed state. The first spring member 125 interposed between the sliding member 121 and the washer 105 presses the washer 105 toward the support portion 113 of the drain pipe 111, that is, the upper portion, by the resiliently restoring force, so that the drain pipe 111 is completely fixed to the basin 1.

On the contrary, when the drain pipe assembly 100 for installation of the washstand according to the second embodiment of the present invention is disassembled from the basin 1, the latch 123 is rotated to spread both ends thereof, and the latch 123 is released from the recessed groove 111a. And then, the fastening/trapping module 7 is released from the drain pipe 111 by the first spring member 125, and thus the drain pipe 111 is in a free state from the basin 1. The drain pipe 111 is separated from the drain port of the basin 1 from the downward direction to the upward direction.

FIG. 12 is a perspective view illustrating a drain pipe assembly for installation of a washstand according to the third embodiment. FIG. 13 is an exploded perspective view illustrating the drain pipe assembly for installation of the washstand according to the third embodiment, FIG. 14 is a cross-sectional view illustrating the drain pipe assembly for installation of the washstand according to the third embodiment. FIG. 15 is a perspective view illustrating a portion of a fastening member of the drain pipe assembly for installation of the washstand according to third embodiment. FIG. 16 is an enlarged cross-sectional view illustrating the fastening member of the drain pipe assembly for installation of the washstand according to third embodiment. FIG. 17 is a perspective view illustrating an operating state of the drain pipe assembly for installation of the washstand according to the third embodiment. FIG. 18 is a cross-sectional view illustrating a state in which the drain pipe assembly for installation of the washstand according to the third embodiment is installed on the basin.

As illustrated in FIGS. 12 to 18, the drain pipe assembly 100 for installation of the washstand according to the third embodiment of the present invention includes a drain pipe 111 and a fastening member.

The fastening member is configured to fix the basin 1 between flanges 113, and includes a sliding member 121, a handle 122, and an urging part. The fastening member resiliently presses the side of the drain pipe 111 to fasten the basin 1 and the drain pipe 111 together. Specifically, the drain pipe 111 is fastened to or unfastened from the basin 1 by the fastening member. The fastening operation and the unfastening operation are easily carried out by a one-touch manner. Hereinafter, the one-touch structure and operation of the fastening member will be described in detail.

The drain pipe 111 is formed in an extended tubular shape, and has a flange 113 at an upper portion. The flange 113 is radially outwardly extended from an upper end thereof when seen from the longitudinal direction of the drain pipe 111, and thus is seated on a top surface of the base of the basin 1. The drain pipe 111 is inserted in a drain port formed in the base of the basin 1, and is seated on the flange 113, so that the drain pipe 111 penetrates the through-hole of the basin 1. The drain pipe 111 is inserted in the through-hole from the upper portion, and is exposed downwardly from the lower portion of the basin 1. Recessed grooves 111a are formed on an outer peripheral surface of the drain pipe 111 at a location lower than the flange 113.

The recessed grooves 111a are located at a position downwardly away from the flange 113 in the longitudinal direction of the drain pipe 111. Several recessed grooves 111a may be provided which are vertically spaced apart from each other in the longitudinal direction of the drain pipe 111. The recessed grooves 111a may be, formed on the outer peripheral surface of the drain pipe in, a circumferential direction.

A lower end of a second link member 124b which will be described below, i.e., a bent portion 1243b, is inserted in the recessed groove 111a. The recessed groove 111a is formed in such a way that an upper portion is inclined in an extension direction of the lower end of a second link member 124b, i.e., the bent portion 1243b, and a lower portion extends in a horizontal direction. Preferably, the upper portion of the recessed groove 111a is formed to have the same inclined angle as an angle of the bent portion 1243*b* of the second link member 12411. With the above configuration, when the bent portion 1243*b* comes out from the recessed groove 111*a*, the bent portion 1243*b* is smoothly slid from the recessed groove 111*a* along the inclined surface of the upper portion of the recessed groove 111*a*. When the bent portion 1243*b* is inserted in the recessed groove 111*a*, the bent portion 1243*b* is caught by the horizontal surface of the lower portion of the recessed groove 111*a*, and thus the sliding member 121 is firmly fixed to the drain pipe 111.

The sliding member 121 is formed in a hollow tubular shape, and the drain pipe 111 is inserted in the sliding member 121. The sliding member 121 has a tubular portion 1211 which is fitted onto the drain pipe 111, a flange 1212 radially outwardly extended from an upper end thereof to support a bottom surface of the base of the basin 1, a rotational support portion 1213 to be assembled to a handle 122 which will be described later, and a guide portion 1216.

A ring-shaped packing 101 made of rubber or the like to serve as a sealing is respectively interposed between the top surface of the base of the basin 1 and the flange 113 of the dram pipe 111, and between the bottom surface of the base of the basin 1 and the flange 113 of the sliding member 121. The flange 1212 supports a bottom surface of the packing 101, and is easily held by a hand of an installer when the sliding member 121 slides. The side of the tubular portion 1211 is formed with a groove portion 1214 below the flange 1212, and a lower end of the second link member 124*b* is inserted in the groove portion 1214. The lower end of the second link member 124*b* communicates with the side of the drain pipe 111 through the groove portion 1214. The guide portion 1216 is a slot vertically extending along the outer peripheral surface of the sliding member 121. The second link member 124*b* is inserted in the slot vertically formed between the guide portion 1216 and the tubular portion 1211, and thus is guided to be slidably moved in a vertical direction. The guide portion 1216 is formed to have an almost C-shaped cross section, and is provided on the outer peripheral portion of the tubular portion 1211 to vertically communicate the space between the tubular portion 1211 and the guide portion 1216.

The sliding member 121 may not be formed with the groove portion 1214, and the sliding member 121 may be shortened so that the lower end of the second link member 124*b* is positioned below the lower end of the sliding member 121.

The handle 122 is formed in a bar shape, and has an upper end which is rotated by a hinge shaft 1223 toward the outside of the sliding member 121. The handle 122 is rotatably connected to the hinge shaft 1223 which is a pivot shaft of the rotational support portion 1213, and the rotational support portion 1213 is a bracket provided at a lower portion of the flange 1212. The handle 122 can be rotatably connected to the flange 1212.

The handle 122 is rotatable around the hinge shaft 1223 with respect to the sliding member 121, and an axial direction of the hinge shaft 1223 is perpendicular to the longitudinal direction of the drain pipe 111. It is preferable that a pair of handles 122 is provided at opposite positions of the sliding member 121. The number of the handles can be increased or decreased if necessary. The handle 122 extends towards a radius of rotation on the basis of the hinge shaft 1223. The handle 122 should be extended to have a sufficient length so as to transfer a strong force by a leverage effect even by relative less force when the installer rotates the handle 122 by his or her hand.

The urging member is to compress or depress the side of the drain pipe 111 by the rotation of the handle 122, and has a first link member 124*a*, the second link member 124*b*, and a spring member 125*a*. The first link member 124*a* has an upper end rotatably connected to the handle 122, and a lower end formed with a locking groove 1242*a*. The upper end of the first link member 124*a* has pivot shafts 1241*a* protruding from both sides thereof, and the handle 122 is rotatably connected to the pivot shaft. The handle 122 has a C-shaped cross section, and is formed with through-holes to receive the pivot shaft 1241*a*. The upper end of the first, member 124*a* is rotatably connected to a position spaced apart from the hinge shaft 1223 in the longitudinal direction of the handle 122. The pivot shaft 1241*a* may be provided in a separate way, and the upper end of the first link member 124*a* may be formed with insertion holes, so that the pivot shaft 1241*a* can be inserted in the handle 122 and the first link member 124*a*, thereby connecting the first link member 124*a* to the handle 122 in a rotatable manner.

The second link member 124*b* has an upper portion connected to the locking groove 1242*a*, and a lower portion extending toward the side of the drain pipe 111. The upper end of the second link member 124*b* is provided with a hook portion 1241*b*, and the hook portion 1241*b* is inserted and engaged to the locking groove 1242*a* of the first link member 124*a*. A portion of the lower end of the second link member 124*b* has a bent portion 1243*b* radially inwardly inclined toward the side of the drain pipe 111. The hook portion 1241*b* is loosely inserted in the locking groove 1242*a* in such a way that it is movable in a vertical direction. Since the hook portion 1241*b* is loosely inserted in the locking groove 1242*a*, the clearance of the recessed groove 111*a* can be increased. Alternatively, the dimension of the urging force can be adjusted by changing the size of the locking groove 1242*a* to regulate the clearance.

The bent portion 1243*b* is inserted in the groove portion 1214 formed in the sliding member 121, and extends toward the side of the drain pipe 111. The outer surface of the second link member 124*b* is provided with a pair of engaging pieces 1242*b* spaced apart from each other in a vertical direction to support the spring member 125*a* which will be described later. Upper and lower bent ends of the spring member 125*a* are inserted in the engaging pieces 1242*b*.

The lower end of the bent portion 1243*b* of the second link member 124*b* is inserted in the groove portion 1214, and the bent portion thereof is caught by the upper end of the groove portion 1214 of the sliding member 121, and thus is resilient deformed in a direction to decompress the drain pipe 111. The decompressing direction of the bent portion 1243*b* means a direction inclined from its original inclined angle, which is, prior to resilient deformation, to the radial outside of the drain pipe 111.

The spring member 125*a* is interposed between the second link member 124*b* and the guide portion 1216, and is made in the shape of a leaf spring, of which one side is supported between the engaging pieces 1242*b* of the second link member 124*b*. The other side of the spring member 125*a* is close to the inner wall of the guide portion 1216 to resiliently urge the second link member 124*b* toward the drain pipe 111.

If the handle 122 rotates around the hinge shaft 1223 to the outside of the sliding member 121 (counterclockwise direction in FIG. 16), the first link member 124*a* connected to the handle 122 to be rotatable around the pivot shaft 1241*a* is moved in the upward direction. The second link member 124*b* connected to the first link member 124*a* is pulled upwardly by the hook portion 1241*b*, and then is moved in the upward direction. If the second link member 124b is moved in the upward direction, the bent portion 1243b is slid along the lower end of the sliding member 121, and then is radially outwardly moved, in the case where the upper end of the groove portion 1214 is not formed with the groove portion 1241, and the second link member 124b is extended to the lower end of the sliding member 121. As a result, the end of the bent portion 1243b comes out from the recessed groove 111a of the drain pipe 111. Therefore, the sliding member 121 can be freely slid in the longitudinal direction of the drain pipe 111.

On the contrary, if the handle 122 rotates around the hinge shaft 1223 to the inside of the sliding member 121 (clockwise direction in FIG. 16), the first link member 124a connected to the handle 122 to be rotatable around the pivot shaft 1241a is moved in the downward direction. The second link member 124b connected to the first link member 124a is urged downwardly by the first link member 124a, and then is guided and moved in the downward direction by the guide portion 1216. If the second link member 124b is moved in the downward direction, the bent portion 1243b is released from the upper end of the groove portion 1214, and then the end of the bent portion 1243b is inserted in the recessed groove 111a of the drain pipe 111 by the resilient restoration. In this instance, the spring member 125a continuously resiliently urges the second link member 124b in a direction to insert the bent portion 1243b to the recessed groove 111a. As a result, the sliding member 121 is restricted in the longitudinal direction of the drain pipe 111, and thus the sliding movement is limited. The sliding member 121 is urged in the upward direction by the resiliently urging force of the first link member 124a and the second link, member 124b.

While not illustrated in the drawings, the lower end of the drain pipe 111 is coupled to the trapping pipe. The trapping pipe is to collect the water in a trap with a bent flow path, thereby preventing gases or bad smells from being flowing backward, or alien matters or bugs from coming in.

Explaining the assembling process of the drain pipe assembly 100 for installation of the washstand according to the first embodiment of the present invention, the drain pipe 111 is first inserted into the drain port formed in the base of the basin 1 from the upward direction to the downward direction. The sliding member 121 is inserted in the drain pipe 111 which is inserted in the drain port and thus is exposed below the basin 1.

Then, the lower end of the drain pipe 111 is fitted or screwed to the trapping pipe. In the state in which the handle 122 is rotated in the open direction (counterclockwise direction in FIG. 16), the sliding member 121 is upwardly slid, and thus the packing 101 is brought into close contact with the bottom surface of the base of the basin 1, while the basin 1 is positioned between the flange 113 of the sliding member 121 and the flange 1212 of the drain pipe 111. If there is no packing 101, the basin 1 is brought into close contact with the flange 113 of the sliding member 121 and the flange 1212 of the drain pipe 111.

In this instance, the pivot shaft 1241a is located at the position outer than the hinge shaft 1223a when seen from radial direction. If the handle 122 is rotated in a close direction (clockwise direction in FIG. 16), the first link member 124a and the second link member 124b are moved in the downward direction, and the bent portion 1243b of the second link member 124b is slid in the state in which it is brought into contact with the upper end of the groove portion 1214. Since the spring member 125a urges the second link member 124b toward the drain pipe 111, the second link member 124b is moved in the downward direction, and the lower end of the bent portion 1243b is inserted in the recessed groove 111a. If the handle 122 is continuously rotated in the state in which the lower end of the bent portion 1243b is inserted in the recessed groove 111a, a compressive load is generated in the first link member 124a and the second link member 124b. Accordingly, the upward load is applied to the sliding member 121, and thus the basin 1 is pressed between the flange 113 of the drain pipe 111 and the flange 1212 of the sliding member 121 so as to be firmly fixed therebetween. If the pivot shaft 1241a is located at the position inner than the hinge shaft 1223 in the radial direction by continuously rotating the handle 122, the assembling process is completed, and the assembled state is maintained as long as an external force is not applied to the handle 122.

The first link member 124a and the second link 124b can be formed in one unit, of which an upper end is rotatably connected to the handle 77, and a lower end has the bent portion 1243b.

The lower end of the bent portion 1243b of the second link member 124b is inserted in the recessed groove of the drain pipe 111. The sliding member 121 is fixed to the drain pipe 111 to support the bottom surface of the base of the basin 1 in a contact state, and the assembling process is completed.

On the contrary, when the drain pipe assembly 100 for installation of the washstand according to the third embodiment of the present invention is disassembled from the basin 1, the sliding member 121 is released from the drain pipe 111 by rotating the handle 122 in the open direction. Thus, the sliding member 121 can be freely slid from the drain pipe 111, and, the state of supporting the bottom surface of the base of the basin 1 in the contact state is released. In this instance, the drain pipe 111 is separated from the trapping pipe, and is taken out from the drain port formed in the base of the basin 1 in the upward direction, thereby completing the disassembling process.

FIG. 19 is a cross-sectional view illustrating a drain pipe assembly for installation of the washstand according to the fourth embodiment of the present invention. FIG. 20 is an exploded cross-sectional view illustrating the drain pipe assembly for installation of the washstand according to the fourth embodiment FIG. 21 is an enlarged cross-sectional view of the circle A in FIG. 19. FIG. 22 is a cross-sectional view of a variation of FIG. 21. FIG. 23 is an enlarged cross-sectional view of the circle B in FIG. 19. FIG. 24 is a cross-sectional view illustrating an operating example of the drain pipe assembly for installation of the washstand according to the fourth embodiment. FIG. 25 is a cross-sectional view illustrating an operating example of the drain pipe assembly for installation of the washstand including a modified sliding member according to the fourth embodiment.

Hereinafter, the longitudinal direction of the drain pipe 111 which is a vertical direction of FIG. 19 is referred to as a longitudinal direction, while a horizontal direction is referred to as a widthwise direction.

As illustrated in FIGS. 19 to 21, the drain pipe assembly for installation of the washstand according to the fourth embodiment includes a drain pipe 111 and a fastening member.

The drain pipe 111 is formed in an extended tubular shape, and has a flange 113 at an upper portion. The flange 113 is radially outwardly extended from an upper end thereof when seen from the longitudinal direction of the drain pipe 111, and thus is seated on a circumference of a drain port 1a formed in the basin to be flush with a top surface of the base of the basin 1. A lower end of the drain pipe 111 extends downwardly through the drain port formed in the basin 1. The drain pipe 111 is installed to the drain port 1a formed in the base of the basin 1 in such a way that the flange 113 is caught by an upper portion of the drain port 1a to maintain the state in which the drain pipe 111 is inserted in the drain port 1a. A recessed groove 111a is formed on an outer peripheral surface of the drain pipe 111 which is exposed below the basin 1.

The recessed groove 111a is configured to, receive a ball member 5 inwardly protruding through a through-hole 121a which will be described later. A plurality of recessed grooves 111a which are vertically spaced apart from each other in the longitudinal direction of the drain pipe 111 are formed on the outer peripheral surface of the drain pipe 111 in a circumferential direction of the drain pipe. The recessed grooves 111a of a concave shape may be formed on the entire outer peripheral surface of the drain pipe 111 in the circumferential direction. Rows of recessed grooves 111a may be formed which are vertically spaced apart from each other in the longitudinal direction of the drain pipe 111.

FIG. 22 is a cross-sectional view of the variation of FIG. 21. The recessed groove 111a is a groove inwardly recessed from the outer peripheral surface of the drain pipe 111, as illustrated in FIG. 21, but may be a groove inwardly depressed from the drain pipe 111 by forming a bent portion 111c, as illustrated in FIG. 22.

The fastening member is configured to fix the drain pipe 111 to the basin 1, and includes a sliding member 121, an pressing member 127, a first spring member 125, and a fixing part.

The fastening member resiliently presses the side of the drain pipe 111, and also resiliently presses the bottom surface of the base of the basin 1 in an upward direction with respect to the longitudinal direction of the drain pipe 111, thereby applying a downward load to the drain pipe 111 and thus engaging the drain pipe 111 to the basin 1.

The sliding member 121 is formed in a hollow tubular shape, and the portion of the drain pipe 111 which is exposed below the basin 1 is slidably inserted in the sliding member 121. The sliding member 121 is upwardly inserted from the lower end of the drain pipe 111.

The sliding member 121 is provided on the side thereof with a plurality of through-holes 121a in which a ball member 5 is positioned. The through-hole 121a penetrates the wall of the sliding member 121. A plurality of through-holes 121a are formed in a circumferential direction and are spaced apart from each other in the longitudinal direction.

As illustrated in FIG. 23, an O-ring 55 is interposed between the sliding member 121 and the drain pipe 111 for the purpose of sealing. Specifically, the O-ring 55 is interposed between the outside of the drain pipe 111 and the inside of the sliding member 121.

The O-ring 55 is positioned below the through-hole 121a in the longitudinal direction. The sliding member 121 and/or the drain pipe 111 may be formed with a groove for receiving the O-ring 55.

The sliding member 121 is provided with a seating boss 121b outwardly protruding the outer peripheral surface. The seating boss 121b protrudes from a position below the through-hole 121a in the longitudinal direction.

The pressing member 127 is configured to support the bottom surface of the base of the basin 1, and the drain pipe 111 is fitted into the pressing member 127 in such a way that the pressing member 127 is slidably moved along the drain pipe 111. The portion 111 of the drain pipe 111 which is exposed below the basin 1 is fitted into the pressing member 127. The pressing member 127 is formed with a receiving portion 1271 with a bottom being opened, and the first spring member 125 is installed in the receiving portion 1271. The pressing member 127 may not have the receiving portion 1271, but may have a protrusion outwardly protruding, like a flange. Hereinafter, the receiving portion 1271 or the protrusion, which is brought into contact with the upper end of the first spring member 125, provided on the pressing member 127 is referred to as an upper support portion.

The pressing member 127 is positioned between the basin 1 and the sliding member 121.

A ring-shaped packing 101 made of rubber or the like is interposed between the flange portion 113 of the drain pipe 111 and the top surface of the base of the basin 1, and between the pressing member 127 and the bottom surface of the base of the basin 1 for the purpose of sealing. The drain pipe 111 is inserted into the packing 101.

The pressing member 127 is urged upwardly by the first spring member 125.

The first spring member 125 is interposed between the sliding member 121 and the pressing, member 127 in the longitudinal direction, and thus is pressed from both sides. The lower portion is brought into contact with the sliding member 121 and is supported by the sliding member, while the upper portion is brought into contact with the pressing member 127 and is supported by the pressing member. The first spring member 125 may be a coil spring.

The first spring member 125 presses the pressing member 127 against the bottom surface of the base of the basin 1. The upper portion of the first spring member 125 is brought into contact with the upper support portion of the pressing member 127 by inserting the first spring member in the receiving portion or bringing it into contact with the protrusion, and is supported by the upper support portion. The lower portion is brought into contact with the upper end of the sliding member 121, and is supported by the upper end.

When the sliding member 121 is fixed to the drain pipe 111, the first spring member 125 resiliently presses the pressing member 127 in the upward direction, so that the drain pipe 111 is coupled to the basin 1.

The fixing member is configured to fix the sliding member 121 to the drain pipe 111, and has a locking member 128, a second spring member 123b, and a ball member 5.

The locking member 128 is slidably moved along the outer peripheral surface of the sliding member 121 in the longitudinal direction. The sliding member 121 is moved and positioned in the locking member 128.

The locking member 128 has a body with upper and lower opened portions, and the lower portion is provided with a stopper boss 1282 protruding toward the sliding member 121. The stopper boss 1282 protrudes inwardly from the locking member 128 in the widthwise direction, and is locked to the seating boss 121b formed on the sliding member 121, thereby restricting the sliding distance of the locking member in the upward direction. The stopper boss 1282 has an inner end positioned inner than an outer end of the seating boss 121b in the widthwise direction.

The locking member 128 is provided with a pressing boss 1281. The pressing boss 1281 protrudes inwardly from the inside of the locking member 128 in the widthwise direction, and is positioned above from the stopper boss 1282 in the longitudinal direction. The pressing boss 1281 is positioned below the upper end of the locking member 128 in the longitudinal direction. The pressing boss 1281 has a top surface tapered toward the ball member 5. The inner surface of the upper portion of the locking member 128 which corresponds to the upper portion of the pressing boss 1281 is formed to be outer than the pressing boss 1281 in the widthwise direction. Therefore, if the upper portion of the locking member is positioned on the ball member 5, the ball member 5 is not pressed in the inward direction. If the locking member 128 is formed in a cylindrical shape, the locking member has an inner diameter larger than that of the pressing boss 1281.

When the upper end of the stopper boss 1282 is brought into contact with the lower end of the seating boss 121*b*, the pressing boss 1281 is positioned against the ball member 5.

When the pressing boss 1281 is positioned against the ball member 5, the pressing boss 1281 is brought, into contact with the ball member 5, so that the ball member 5 positioned in the through-hole 121*a* is pressed inwardly (toward the drain pipe 111) by the pressing boss 1281 in the widthwise direction. If the upper portion of the locking member is positioned on the ball member 5 by moving the locking member 128 down, the ball member 5 is not pressed inwardly. The inner end of the pressing boss 1281 is formed to be outer than the outer surface of the sliding member 121.

The ball member 5 is positioned in the through-hole 121*a*. If the ball member 5 is pressed inwardly by the pressing boss 1281 in the widthwise direction, the ball member is exposed to the drain pipe 111 through the through-hole 121, thereby pressing the drain pipe 111.

When the ball member 5 is brought into contact with the inner end of the recessed groove 111*a*, the widthwise distance from the inner end of the recessed groove 111*a* of the drain pipe 111 to the inner end of the pressing boss 1281 is equal to or larger than the diameter of the ball member 5, and the widthwise distance from the outer surface of the drain pipe 111 to, the inner end of the pressing boss 1281 is smaller than the diameter of the ball member 5. Accordingly, when the pressing boss 1281 is positioned against the ball member 5, the ball member 5 is inserted in the recessed groove 111*a*. Meanwhile, the widthwise distance from the outer surface of the drain pipe 111 to the inner surface of the upper portion of the locking member is larger than the diameter of the ball member 5, and the widthwise distance from the outer surface of the sliding member 121 to the inner surface of the upper portion of the locking member is smaller than the diameter of the ball member 5. Accordingly, when the upper portion of the locking member is positioned on the ball member 5, the sliding, member 121 can be slid while the ball member 5 is not released.

The seating boss 121*b* of the sliding member 121 is positioned between the pressing boss 1281 and the stopper boss 1282, and the siding member 121 is inserted in the second spring member 123*b*, so that the second spring member 123*b* is interposed between the pressing boss 1281 and the seating boss 121*b*. The second spring member 123*b* may be a coil spring.

If the sliding member 121 and the locking member 128 are made of a pipe having a circular cross section, the inner diameter of the pressing boss 1281 is larger than the outer diameter of the sliding member 121. The outer diameter of the seating boss 121*b* is larger than the inner diameter of the stopper boss 1282. The second spring member 123*b* is positioned between the seating boss 121*b* and the pressing boss 1281 in the longitudinal direction, and is inserted in the cylindrical space formed between the sliding member 121 and the locking member 128.

The second spring member 123*b* is positioned between the seating boss 121*b* and the pressing boss 1281, and presses the seating boss 121*b* and the pressing boss 1281 in a direction to be away from each other. The locking member 128 is upwardly pressed by the second spring member 123*b*.

When the external force is not applied to the locking member 128, the locking member 128 is upwardly pressed by the second spring member 123*b*, and the stopper boss 1282 is brought into contact with the seating boss 121*b*. The pressing boss 1281 is positioned against the ball member 5, and the ball member 5 is inwardly pressed by the pressing boss 1281 in the widthwise direction. Since the ball member 5 protrudes inwardly through the through-hole 121*a*, if the ball member 5 is positioned in the recessed groove 111*a* by moving the sliding member 121 in the vertical direction, so that the sliding member 121 is fixed to the drain pipe 111.

In this instance, the first spring member 125 positioned between the pressing member 127 and the sliding member 121 is compressed, and thus the pressing member 127 is upwardly pressed. Accordingly, the basin 1 is pressed between and by the flange 113 and the pressing member 127, and thus the drain pipe 111 is fixed to the basin 1.

The lower end of the drain pipe 111 is coupled to the trapping pipe 131. The trapping pipe 131 is to collect the water in a trap with a bent flow path, thereby preventing gases or bad smells from being flowing backward, or alien matters or bugs from coming in. The O-ring 55 is interposed between the sliding member 121 and the trapping pipe 131 for the purpose of sealing.

With the above-described configuration of the drain pipe assembly 100 for installation of the washstand according to the fourth embodiment, when the drain pipe assembly is installed to the basin 1, the drain pipe 111 is first inserted into the drain port 1*a* formed in the base of the basin 1 from the upward direction to the downward direction. In this instance, the packing 101 can be fitted to the drain pipe 111 to be positioned at the lower portion of the flange 113, and then the drain pipe 111 can be inserted in the drain port 1*a* of the base of the basin 1.

In the state in which the drain pipe 111 is inserted in the drain port 1*a*, the pressing member 127 and the first spring member 125 are sequentially fitted to the lower portion of the drain pipe 111 which is, exposed below the basin 1. And then, the module, in which the sliding member 121, the locking member 128, the second spring member 123*b*, and the ball member 5 are assembled, is fitted to the drain pipe 111 to be positioned below the pressing member 127. Before the pressing member 127 is fitted, another packing 101 can be first fitted so that the packing 101 is provided on the pressing member 127.

If the upper portion of the locking member 128 is positioned on the ball member 5 by pulling the locking member 128 down, as illustrated in FIG. 24, the ball member 5 is freely moved in the widthwise direction, and thus the sliding member 121 is freely slid from the drain pipe 111. In this instance, the lower end of the sliding member 121 is inserted in the trapping pipe 131. Then, if the pulling state of the locking member 128 is released, the locking member 128 is moved up by the restoring force of the second spring member 123*b*, and thus the ball member 5 is pressed. If the sliding member 121 is moved along the drain pipe 111 in the vertical direction in the state in which the ball member 5 is pressed, the ball member 5 is positioned in the recessed groove 111*a*, thereby completing the fastening process.

The lower end of the sliding member 121 of the module, in which the sliding member 121, the locking member 128, the second spring member 123*b*, and the ball member 5 are assembled, is fitted to the trapping pipe 131, and then the first spring member 125 and the pressing member 127 are positioned on the sliding member 121. The pressing member 127, the first spring member 125, the sliding member 121, the locking member 128, the second spring member 123*b*, and the ball member 5 are positioned below the basin 1. In this instance, the packing 101 may be positioned on the basin 1, or on the basin 1 and the pressing member 128. The drain pipe 111 can be inserted in the pressing member 128 and the sliding member 121 from the upper portion of the drain port 1a to the lower portion. When the drain pipe 111 is inserted, the ball member 5 is positioned in the recessed groove 111a, thereby completing the fastening process.

On the contrary, when the drain pipe assembly 100 for installation of the washstand according to the fourth embodiment is disassembled from the basin 1, the upper portion of the locking member 128 is released from the pressing state of the ball member 5 by pulling the locking member 128 down. In this instance, the drain pipe 111 is moved upwardly to separate from the drain port 1a formed in the base of the basin 1, thereby completing the disassembling process.

Alternatively, after the sliding member 121 is separated from the trapping pipe 131, and the upper portion of the locking member 128 is released from the pressing state of the ball member 5 by pulling the locking member 128 down, the module, in which the sliding member 121, the locking member 128, the second spring member 123b, and the ball member 5 are assembled, is separated from the lower end of the drain pipe 111, thereby completing the disassembling process.

Meanwhile, FIG. 25 is a cross-sectional view illustrating an operating example of the drain pipe assembly for installation of the washstand according to a variation of the present invention. The drain pipe assembly in FIG. 25 is substantially similar to that according to the fourth embodiment, except for a corrugated extension, and thus the same configuration thereof will be not described.

Referring to FIG. 25, the lower end of the sliding member 121 is connected to the trapping pipe 131 via an extension 1217. The extension 1217 is provided to the sliding member 121 and the trapping pipe 131.

The extension 1217 is made of a flexible material, such as a corrugated pipe, at the lower portion of the sliding member 121, so as to contract or retract in the longitudinal direction. Accordingly, when the drain pipe assembly is disassembled, the sliding member 121 is not detached from the trapping pipe 131, but the extension 1217 is contracted or retracted, thereby easily lowering and separating the module, in which the sliding member 121, the locking member 128, the second spring member 123b, and the ball member 5 are assembled, from the drain pipe 111.

After the sliding member 121 is inserted in the extension 1217, the extension 1217 can be coupled to the sliding member 121 by tightening the outer surface of the extension. The extension 1217 can serve as a trapping pipe by bending a portion thereof, without using the separate trapping pipe 131.

FIG. 26 is a cross-sectional view illustrating the drain pipe assembly for installation of the washstand including an interference-fit fastening member according to the fifth embodiment of the present invention. FIG. 27 is an enlarged cross-sectional view illustrating a coupling portion and a drain pipe in the drain pipe assembly for installation of the washstand according to the fifth embodiment in FIG. 26. FIG. 28 is a perspective view illustrating a coupling portion of the drain pipe assembly for installation of the washstand according to a variation of FIG. 26. FIG. 29 is an enlarged cross-sectional view illustrating the coupling portion and a drain pipe in the drain pipe assembly for installation of the washstand according to the variation of FIG. 26. FIG. 30 is an enlarged cross-sectional view illustrating the coupling portion and the drain pipe in the drain pipe assembly for installation of the washstand according to another variation of FIG. 26.

Figure 2:
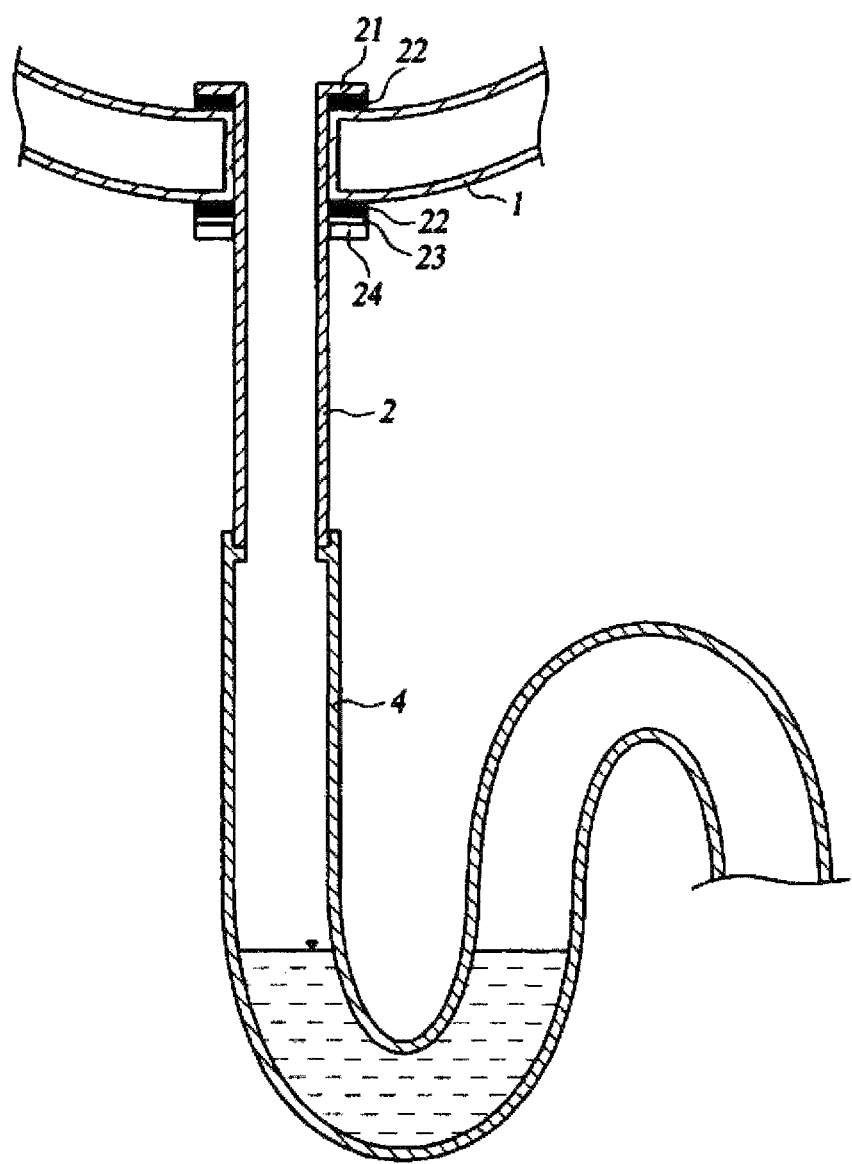

Hereinafter, the vertical direction in FIG. 2 is referred to as a longitudinal direction.

As illustrated in FIGS. 26 and 27, the drain pipe assembly for installation of the washstand including an interference-fit fastening member according to the fifth embodiment includes a drain pipe 111, a washer 105, a first spring member 125, a sliding member 121, and a trapping pipe 131.

The drain pipe 111 is formed in an extended tubular shape, like a tube, and has a flange 113 at one end thereof. The flange 113 is radially outwardly extended from an upper end thereof when seen from the longitudinal direction of the drain pipe 111, and thus is seated on a circumference of a drain port formed in the basin 1 to be flush with a top surface of the base of the basin 1. A tubular portion of the drain pipe 111 is inserted in the drain port formed in the base of the basin 1, and the flange 113 is caught by the drain port, so that the drain pipe 111 is maintained in the state of being inserted in the drain port formed in the base of the basin 1. The tubular portion of the drain pipe 111 passes below the basin 1 through the drain port.

A ring-shaped packing 101 is interposed between the top surface of the basin 1 and the flange 113 of the drain pipe 111. The basin 1 is formed with a space to discharge the overflowed water to the drain pipe 111, and the drain pipe 111 is provided with a drain hole 12 at the side thereof to communicate with the space. If the drain pipe 111 is inserted in the drain port formed in the base of the basin 1, the drain hole 111d is located at a position communicating with the space.

The washer 105 is formed in a ring shape, and the drain pipe 111 exposed below the basin 1 is fitted in the washer 105 in such a way that the washer can be slid along the tubular portion of the drain pipe 111 in the longitudinal direction. When the drain pipe 111 is installed, the basin 1 is positioned between the washer 105 and the flange 113 of the drain pipe 111, and is pressed by the washer 105 and the flange 113 from both sides. The washer 105 presses the bottom surface of the basin 1. Another packing 101 is provided between the washer 105 and the bottom surface of the basin 1. The packing 101 is formed in a ring shape, and the tubular portion of the drain pipe 111 is fitted in the packing 101. The tubular portion of the drain pipe 1 exposed below the basin 1 is fitted to the packing 101 and the washer 105.

The washer 105 presses the bottom surface of the base of the basin 1 in the upward direction by the resilient force of the first spring member 125 which will be described later, thereby fixing the drain pipe 111 to the basin 1.

The first spring member 125 may be made of a coil spring or a rubber or synthetic resin tube, and is positioned between the washer 105 and the sliding member 121. If the first spring member 125 is made of the rubber or synthetic resin tube, the first spring member has a circular cross section, and is formed with a plurality of holes on its side for the purpose of resilient force.

The lower end of the first spring member 125 is upwardly pressed by the upper end of the sliding member 121, and the upper end is supported by the washer 105. The first spring member 125 is compressed between the upper end of the sliding member 121 and the bottom surface of the base of the basin 1. If the washer 105 is provided, the first spring member 125 presses the washer 105 against the bottom surface of the basin 1.

The sliding member 121 is coupled to the drain pipe 111 which is inserted to the drain hole formed in the base of the basin 1 and then is exposed below the basin 1, and presses the first spring member 125 against the basin 1.

The sliding member 121 is formed of a hollow body, as illustrated in FIG. 28, and the drain pipe 111 is inserted in the sliding member 121. If the sliding member 121 is connected to the drain pipe 111 and thus compresses the first spring member 125, the upper end of the first spring member 125 presses the bottom surface of the basin 1, and a downward load is applied to the drain pipe 111. Therefore, the basin 1 is pressed between the flange 113 and the first spring member 125, and the drain pipe 111 is coupled to the basin 1.

Since the first spring member 125 resiliently presses the bottom surface of the basin 1 in the upward direction by the sliding member 121, the basin 1 and the drain pipe 111 are fastened to each other. Specifically, the drain pipe 111 is configured to be fastened to the basin 1 by the sliding member 121 and the first spring member 125. The upper portion of the sliding member 121 may be provided with a flange 113 which is brought into contact with the lower end of the first spring member 125 to press the lower end thereof. The flange 113 extends radially from the outer peripheral surface of the upper end of the sliding member 121, so that it is easily held by a hand of an installer. The flange 113 may be provided at a position below the upper end of the sliding member 121, so that a protruding portion from the upper portion of the flange 113 is inserted in the first spring member 125.

The sliding member 121 is provided at the upper portion of the trapping pipe 131 which will be described later. In FIG. 26, reference numeral 42 indicates a threaded portion, by which the sliding member 121 is fastened to the trapping pipe 131.

The trapping pipe 131 has the sling member 121 on the upper portion thereof. In FIG. 26, reference numeral 1313 indicates a pipe coupling portion which is provided on the upper portion of the trapping pipe 131 to be connected with the sliding member 121. In the case of thread-type engagement, the pipe coupling portion 1313 may be formed with a threaded portion. The trapping pipe 131 is to collect the water in a trap with a bent flow path, thereby preventing gases or bad smells from being flowing backward, or alien matters or bugs from coming in. The trapping pipe 131 has upper and lower pipes to be coupled to the drain port formed in the base of the basin 1. A portion of the pipe may be formed of a corrugated pipe to be corrugated in a vertical direction.

The sliding member 121 may be engaged with the trapping pipe 131 in an interference-fitting manner, or be formed integrally with the trapping pipe 131. A portion of the upper pipe of the trapping pipe 131 may be the sliding member 121.

The trapping pipe 131 is formed of a hollow body, and has a first partition 1311 and a second partition 1312 therein. The first partition 1311 is downwardly extended at an angle from the upper portion, while the second partition 1312 is upwardly extended at an angle from a lower portion. The lower end of the first partition 1311 is formed lower than the upper end of the second partition 1312, and thus the water is filled in the trapping flow path formed between the first and second partitions. Specifically, with the configuration of the first partition 1311 and the second partition 1312, the inside of the trapping pipe 131 is provided with a U-shaped bent flow path. The inclined direction of the first partition 1311 may be formed in parallel with that of the second partition 1312. The trapping pipe 131 may be made of a U-shaped pipe.

The sliding member 121 can be provided as various modes, and concrete examples will be described later.

At least one O-ring 55 is provided between the sliding member 121 and the drain pipe 111, and the sliding member 121 is engaged, with the trapping pipe 131 in the interference-fitting manner. A plurality of O-rings 55 may be provided on the sliding member 121 to be spaced apart from each other in the longitudinal direction. The inner peripheral surface of the sliding member 121 is formed with an O-ring groove 55a for receiving the O-ring 55. The O-ring groove may be formed on the outer peripheral surface of the drain pipe 111.

The O-ring 55 is made of an elastic material, such as rubber, and is seated in the O-ring groove 55a. The inner diameter of the O-ring 55 seated in the O-ring groove 55a is smaller than the outer diameter of the drain pipe 111. If the sliding member 121 is upwardly moved along the longitudinal direction by applying the external force to the sliding member, the drain pipe 111 is slid in the sliding member 121, and then the first spring member 125 is compressed by the bottom surface of the basin 1 and the sliding member 121. If the washer 105 is fitted to the drain pipe 111, the top surface of the washer 105 is brought into contact with the bottom surface of the basin 1, and the first spring member 125 is compressed between the bottom surface of the washer 105 and the upper end of the sliding member 121.

If the sliding member 121 is upwardly moved until the drain pipe 111 is fitted to the O-ring 55, the drain pipe 111 is fitted to the O-ring 55 in the interference-fitting manner. Since the drain pipe 111 is fitted to the O-ring 55, even though the external force is not applied to the sliding member 121 after the sliding member 121 is engaged to the drain pipe 111, the sliding member 121 is not slid downwardly from the drain pipe 111 by the elastic force and the frictional force of the O-ring 55.

The sliding member 121 may have the inner diameter smaller than the outer diameter of the drain pipe 111, so that the sliding member 121 and the drain pipe 111 are coupled to each other in the interference-fitting manner. In this instance, the O-ring 55 may not be provided.

Meanwhile, FIG. 28 is the perspective view illustrating the coupling portion of the drain pipe assembly for installation of the washstand according to a variation of FIG. 26. FIG. 29 is the enlarged cross-sectional view illustrating the coupling portion and the drain, pipe in the drain pipe assembly for installation of the washstand according to the variation of FIG. 26.

The sliding member 121 may be engaged to the drain pipe 111 by a locking boss and a locking groove. Referring to FIGS. 28 and 29, the outer peripheral surface of the drain pipe 111 is provided with at least one locking boss 111b protruding in a radial direction. One or more locking bosses 111b are formed in the circumferential direction.

The inner peripheral surface of the sliding member 121 is formed with a fitting groove 121c extending downwardly from the upper end to receive the locking boss 111b in the longitudinal direction. Also, the inner peripheral surface of the sliding, member 121 is formed with a locking groove 121d having a shoulder to prevent the locking boss 111b, which is inserted in the fitting groove 121c, from coming out. The locking groove 121d is formed on the inner peripheral surface of the sliding member 121 in the circumferential direction. The locking groove 121d is formed below the upper end of the sliding member 121. A circumferential end of the locking groove 121*d* is connected to the fitting groove 121*c*.

The outer diameter of the drain pipe 111 is smaller than the inner diameter of the sliding member 121, and the portion formed with the locking boss 111*b* is larger than the inner diameter of the sliding, member 121. The portion formed with the locking boss 111*b* is smaller than the portion formed with the fitting groove 121*c* and the locking groove 121*d*. When the drain pipe 111 is inserted in the sliding member 121, the drain pipe is not inserted by the locking boss 111*b*. However, if the drain pipe 111 is inserted in the sliding member 121 by aligning the locking boss 111*b* with the fitting groove 121*c*, the drain pipe 111 is slidably inserted in the sliding member 121. The locking boss 111*b* is inserted in the fitting groove 121*c*, and then is slid in the downward direction.

After the fitting groove 121*c* is aligned with the locking boss 111*b* in the state in which the sliding member 121 is positioned at the lower portion of the drain pipe 111, the sliding member 121 is inserted in the drain pipe 111 to the upward direction. Then, the drain pipe 111 is fitted to the sliding member 121 until the locking boss 111*b* reaches the position of the locking groove 121*d*, and the sliding member 121 is rotated with respect to the drain pipe 111, so that the locking boss 111*b* moves along the locking groove 121*d* while does not come out m the vertical direction by the locking shoulder. Accordingly, the sliding member 121 is fixed to the drain pipe 111. The locking shoulder is formed on the upper and lower portions of the locking groove 121*d*.

In this instance, the first spring member 125 is compressed between the bottom surface of the basin 1 and the upper end of the sliding member 121. In FIG. 29, reference numeral 55 indicates an O-ring, and reference numeral 55*a* indicates an O-ring groove formed on the inner surface of the sliding member 121 to receive the O-ring 55. The O-ring groove 55*a* is formed in a concave shape at a position below the locking groove 121*d* in the longitudinal direction.

If the sliding member 121 is separated from the drain pipe 111, the sliding member 121 is rotated until the locking boss 111*b* sliding along the locking groove 121*d* reaches the locking groove 121*d*, and then the locking boss 111*b* is slid along the fitting groove 121*c*. And, the sliding member 121 is moved downwardly to separate from the drain pipe 111.

FIG. 30 is the enlarged cross-sectional view illustrating the coupling portion and the drain pipe in the drain pipe assembly for installation of the washstand according to another variation of FIG. 26.

Referring to FIG. 30, the sliding member 121 may further have the locking member which is illustrated in FIG. 26. Specifically, the locking boss 111*b* protrudes from the outer peripheral surface of the drain pipe 111 to support the O-ring 55 from the lower side. The locking boss 111*b* may protrude in a ring shape along the circumferential direction from the outer peripheral surface of the drain pipe 111, or plural locking bosses 111*b* may be spaced apart from each other in the circumferential direction. The inner diameter of the sliding member 121 has a size so as not to be caught by the locking boss 111*b*.

The locking boss 111*b* of the drain pipe 111 is formed to be larger than the inner diameter of the O-ring 55.

At least one O-ring 55 is provided between the sliding member 121 and the drain pipe 111. A plurality of O-rings 55 may be provided on the sliding member 121 to be spaced apart from each other in the longitudinal direction. The inner peripheral surface of the sliding member 121 is formed with an O-ring groove 55*a* for receiving the O-ring 55. The O-ring 55 is made of an elastic material, such as rubber, and is seated in the O-ring groove 55*a*.

If the sliding member 121 is upwardly moved along the longitudinal direction of the drain pipe 111 by applying the external force to the sliding member, the locking boss 111*b* is brought into contact with the O-ring 55, and thus the O-ring is deformed and expanded. After the locking boss 111*b* passes the O-ring 55, the O-ring 55 is again contracted. The locking boss 111*b* is positioned below the O-ring 55 to support the O-ring 55. The first spring member 125 is compressed by the bottom surface of the basin 1 and the sliding member 121. Since the O-ring 55 is seated in the O-ring groove 55*a* of the sliding member 121, when the O-ring 55 is supported below the locking boss 111*b*, the sliding member 121 is also supported by the O-ring 55, thereby preventing the sliding member from being released from the drain pipe 111 toward the lower side.

The locking boss 111*b* supports the lower portion of the O-ring 55 to obtain the fixing force stronger than that of the embodiment in FIG. 26.

In addition, the outer peripheral surface of the lower end of the drain pipe 111 may be formed with a threaded portion, and the inner peripheral surface of the sliding member 121 may be formed with a threaded portion, thereby threadedly engaging the drain pipe 111 and the sliding member 121. If the sliding member 121 is threadedly engaged to the drain pipe Ill and then is moved upwardly, the first spring member 125 is compressed between the basin 1 and the sliding member 121.

Alternatively, as disclosed in Korean Unexamined Utility Model Publication No. 20-2010-0011061, the sliding member 121 may be made, of a coupling for a hydraulic hose, and the outer peripheral surface of the drain pipe 111 may be formed with a groove, thereby engaging the sliding member 121 to the drain pipe 111. When the sliding member 121 is coupled to the drain pipe 111 by upward movement, the first spring member 125 is compressed between the bottom surface of the basin 1 and the sliding member 121.

FIG. 31 is a front view illustrating the drain pipe assembly for installation of the washstand including a clamp fastening member according to the sixth embodiment of the present invention. FIG. 32 is an exploded front view of the drain pipe in FIG. 31, FIG. 33 is a cross-sectional view taken along the line A-A in FIG. 32. FIG. 34 is a diagram of a variation of FIG. 33. FIG. 35 is a front view illustrating a sliding member of the drain pipe assembly in FIG. 31. FIG. 36 is a cross-sectional view taken along a longitudinal direction of the sliding member in FIG. 35. FIG. 37 is a plan view illustrating the sliding member in FIG. 35. FIG. 38 is a plan view illustrating a clamp member which is one example of the clamp fastening member according to the sixth embodiment. FIG. 39 is a perspective view of a variation, of FIG. 38. FIG. 40 is a partially cross-sectional view illustrating a state in which the drain pipe and the sliding member are coupled to each other by the clamp member of the drain pipe assembly for installation of the washstand in FIG. 31. FIG. 41 is a partially cross-sectional view illustrating the coupling state of the drain pipe and the sliding member in the drain pipe assembly for installation of the washstand in FIG. 36. FIG. 42 is a cross-sectional view taken along a longitudinal direction of the sliding member in FIG. 41. FIG. 43 is a plan view illustrating a clamp washer of the drain pipe assembly for installation of the washstand in FIG. 41. FIG. 44 is a cross-sectional view of an upper coupling pipe in FIG. 31. FIG. 45 is a perspective view of a trapping cover in FIG. 44. FIG. 46 is a bottom view of the trapping cover.

Hereinafter, in FIG. 31 the vertical direction is referred to as a longitudinal direction, a direction extending from a flange to a packing member is referred to as a downward direction, and a direction extending from the packing member to the flange is referred to as an upward direction.

As illustrated in FIG. 31, a drain pipe assembly 100 for installation of a washstand according to the sixth embodiment includes a drain pipe 111 and a fastening member. The drain pipe 111 is inserted in the drain port formed, in the base of the basin 1, and then is exposed below the basin 1. The fastening member is coupled to the drain pipe 111 which is exposed below the basin 1, so as to fix the drain pipe 111 to the basin 1. The drain pipe 111 has a flange 113 at an upper end thereof. The flange 113 is caught by an upper end of the drain port formed in the base of the basin 1, and the drain pipe 111 is made of a hollow body extending downwardly from the flange 113. The drain pipe 111 is a tube having a circular cross section.

The drain pipe 111 is fitted to a packing 101, and the top surface of the packing 101 is brought into contact with the bottom surface of the flange 113. The bottom surface of the packing 101 is brought into contact with the upper end of the drain port formed in the base of the basin 1 to seal between the drain pipe 111 and the upper end of the drain port, thereby preventing water from leaking. The drain pipe 111 is fitted to another packing 101, and the upper end of the packing 101 is brought into contact with the lower end of the drain port formed in the base of the basin 1. The packing 101 seals between the drain pipe 111 and the lower end of the drain port, thereby preventing water from leaking. The drain pipe 111 is fitted to a washer 105, and the top surface of the washer is brought into contact with the bottom surface of the packing 101. The bottom surface of the washer 105 is brought into contact with the upper end of a first spring member 125, and then is pressed in the upward direction. The washer 105 transfers the upwardly pressing force of the first spring member 125 to the packing 101.

The upper end of the first spring member 125 is brought into contact with the bottom surface of the washer 105 to press the washer in the upward direction. The lower end of the first spring member 125 is brought into contact with the upper end of the sliding member 121 to press the sliding member in the downward direction.

Accordingly, the external force is applied to the flange 113 of the drain pipe 111 to pull the drain pipe down, so that the drain pipe 111 is brought into close contact with the basin 1.

The fastening member consists of the sliding member 121, a clamp member 141 to, fix the sliding member 121 and the drain pipe 111, and the first spring member 125. The drain pipe 111 exposed below the basin 1 is slidably inserted in the sliding member 121. The clamp member 141 is positioned between the sliding member 121 and the drain pipe 111. The clamp member 141 is configured to clamp a recessed groove 111a formed on the outside of the outer portion of the drain pipe 111 and thus hold the sliding member 121. The drain pipe 111 is inserted in the first spring member 125 in the vertical direction. The first spring member 125 is inserted in the sliding member 121 through a spring groove 1218. The first spring member 125 is positioned between the basin 1 and the sliding member 121, and is compressed therebetween, thereby pressing the sliding member 121 in the downward direction and thus fixing the basin 1 and the drain pipe 111.

The sliding member 121 can be connected to the upper end of an upper coupler 151 which guides the water flowing along the drain pipe 111 to a drain.

The lower end of the upper coupler 151 consist, lower coupler 135 for guide the water from the washstand to sewer and the extension 1215 connected to lower end of the upper coupler 151.

The lower coupler 135 has a joint member 137 fitted in the lower coupler 135, and a packing member 139 fitted in the drain. The joint member 137 is positioned the upper coupler 151 and a floor in which the drain is formed.

The upper coupler 151 is made of a hollow body which is fitted in a coupler groove 1219 formed on the lower end of the sliding member 121 and then is tightly fixed to a coupler shoulder 1219a. The extension 1215 is engaged to the lower end of the upper coupler 151. The extension 1215 is made of a corrugated hollow pipe which is made of a soft material to adjust the position of the pipe depending upon the position of the drain. The lower coupler 135 is made of a hollow pipe, of which the upper end is coupled to the lower end of the extension 1215, and the lower end is coupled to the drain.

The joint member 137 is formed in a ring shape to receive the lower coupler 135, of which the bottom surface is brought into close contact with the floor having the drain. The packing member 139 receives the lower coupler 135, of which the upper portion is brought into contact with the bottom surface of the joint member 137, and the lower portion is inserted and fixed to the drain. The packing member 139 is to prevent the water from leaking outwardly from the drain together with the joint member 137.

As illustrated in FIG. 32, the drain pipe 111 is formed with a lateral slot 117 and a recessed groove 111a. The lateral, slot 117 is formed in the drain pipe 111 to be positioned between the flange 113 and the recessed groove 111a in the longitudinal direction. The lateral slot 117 penetrates the drain pipe in a lateral direction. The lateral slot 117 serves as a passage through the water overflowing from the basin 1 is discharged.

As illustrated in FIGS. 32 and 33, the recessed groove 111a is formed at a position above the lower end of the drain pipe 111, and is extended in the circumferential direction.

Alternatively, as illustrated in FIG. 34, the recessed grooves 111a may be formed in parallel with each other at opposite outer sides above the lower end of the drain pipe 111.

As illustrated in FIGS. 35 to 37, the sliding member 121 is made of a hollow body, through which the drain pipe 111 is slidably inserted. The sliding member 121 is formed with a lateral slit 1217a, through which the clamp member 141 protrudes. The lateral slot 1217a provides a space to manipulate the clamp member 141, thereby carrying out the clamping process through the lateral slot.

The inner portion of the sliding member 121 is formed with a seat portion 1215 at a position below the upper end thereof. The first spring member 125 is brought into contact with the seat portion 1215. The seat portion 1215 is radially inwardly extended to form a convex portion. The clamp groove 1217 for receiving the clamp member 141 is recessed on the inner portion of the sliding member at a position below the seat portion 1215. An O-ring groove 55a is formed on the inner portion of the sliding member at a position below the clamp groove 1217. The O-ring 55 is seated in the O-ring groove 55a. The O-ring 55 performs a sealing operation between the drain pipe 111 and the sliding member 121. The lowermost end of the inner portion of the sliding member 121 is formed with a coupler shoulder 1219a at a position below the O-ring groove 55a The coupler shoulder 1219a is radially inwardly extended to form a convex portion. The shoulder surface of the coupler shoulder 1219a faces downward. The coupler shoulder 1219a is configured to bring the upper coupler 151 into close contact with the sliding member 121.

As illustrated in FIG. 38, the clamp member 141 has an arc-shaped portion 1411 and grip portions 1413. The arc-shaped portion 1411 clamps the recessed groove 111a, and the grip portions 1413 are extended from both ends of the arc-shaped portion 1411 and are exposed outwardly from the lateral slit 1217a If the grip portions 1413 are pressed, the arc-shaped portion 1411 is deformed. A subtended angle of the arc-shaped portion 1411 is set to be larger than 180 degrees.

The grip portions 1413 are respectively provided at both ends of the arc-shaped portion 1411, and are extended from the ends of the arc-shaped portion 1411. An angle of a tangential line extended from the grip portions 1413 and the ends of the arc-shaped portion makes about 90 degrees.

Antiskid portions 1415 are extended from both ends of the grip portions 1413 at an angle of 120 degrees or less.

As illustrated in FIG. 39, the clamp member 141 may have a crossed arc-shaped portion 1411. The modified clamp member 141 has the arc-shaped portion 1411 and grip portions 1413. The arc-shaped portion 1411 clamps the recessed groove 111a, and the grip portions 1413 are extended from both ends of the arc-shaped portion 1411 and are exposed outwardly from the lateral slit 1217a. Both ends of the arc-shaped portion 1411 are crossed each other. The grip portions 1413 are extended from both crossed ends of the arc-shaped portion 1411. The grip portion 1413 extended from one end of the arc-shaped portion 1411 is referred to as the other grip portion 1413, while the grip portion 1413 extended from the other end of the arc-shaped portion 1411 is referred to as one grip portion 1413. An angle formed by a tangential line extended from a crossed center of both ends of the arc-shaped portion 1411 and the grip portions 1413 is about 90 degrees.

Accordingly, on the contrary to the clamp member 141 illustrated in FIG. 38, if the grip portions 1413 are radially inwardly pressed, the diameter of the arc-shaped portion 1411 is increased, and thus the drain pipe 111 is fitted in the arc-shaped portion. If the pressure radially inwardly applied to the grip portions 1413 is released after the clamp member is aligned with the recessed groove 111a, the diameter of the arc-shaped portion 1411 to clamp the recessed groove 111a and thus fix the drain pipe 111.

As illustrated in FIG. 40, the outer diameter of the arc-shaped portion is caught by the inner end of the clamp groove 1217 in the state in which the arc-shaped portion 1411 of the clamp member 141 clamps the recessed groove 111a, and thus the drain pipe 111 and the sliding member 121 are engaged to each other so as not to be moved in the longitudinal direction.

As illustrated in FIGS. 41 to 43, the fastening member according to the variation of the clamp fastening member includes a sliding member 121, a clamp washer 161, and a first spring member 125. The drain pipe 111 exposed below the basin is, inserted in the first spring member 125 and the clamp washer 161 in order.

The sliding member 121 is made of a hollow body through which the drain pipe 111 can be slidably inserted.

The inner portion of the upper end of the sliding member 121 is formed with a drain groove 1218a. The drain groove 1218a is extended in the circumferential direction to receive the drain pipe 111 and the first spring member 125. The inner portion of the sliding member 121 is formed with an inclined washer shoulder 2214 below the drain groove 1218a.

If the clamp washer 161 is brought into contact with the washer shoulder 2214, the clamp washer 161 is pivotally moved in the sliding member 121. The drain pipe 111 is fitted to the clamp washer 161.

The drain pipe 111 is inserted in the first spring member 125 in the vertical direction. The first spring member 125 is positioned between the basin 1 and the clamp washer 161. The first spring member 125 downwardly presses the clamp washer 161 and the sliding member 121 to fix the sliding member 121 to the drain pipe 111.

As illustrated in FIG. 42, the sliding member 121 has a washer shoulder 2214, a pivot portion 2212, and a clearance hole 2216. The washer shoulder 2214 is inclined upwardly, and the pivot portion 2212 is formed at the uppermost position of the washer shoulder 2214. The pivot portion 2212 is configured to receive a protrusion 1613 of the clamp washer 161 so as to be pivotally moved. The clearance hole 2216 penetrates the sliding member in a lateral direction at a position opposite to the pivot portion 2212. The clearance hole 2216 is formed at the lowermost position of the washer shoulder 2214. The clearance hole 2216 is vertically extended to secure a space in which an extended protrusion 1615 of the clamp washer 161 can be moved in the vertical direction. The sliding member 121 can be set to a proper position by manipulating the clamp washer 161 through the clearance hole 2216.

The washer shoulder 2214 is formed at the lower end of the clearance hole 2216 and the pivot portion 2212. The clamp washer 161 is seated on the washer shoulder 2214 by the first spring member 125. The washer shoulder 2214 is circumstantially inwardly extended at an angle to be formed in a convex shape. The O-ring groove 55a is formed at a position below the washer shoulder 2214. The inside of the O-ring groove 55a is concave in the circumferential direction to fix the O-ring 55.

The coupler shoulder 1219a is formed at a position below the O-ring groove 1217. The coupler shoulder 1219a is convex in the circumferential direction so that the upper coupler 131 is brought into close contact with the coupler shoulder.

As illustrated in FIG. 43, the clamp washer 161 is provided on the washer shoulder 2214 formed in the sliding member 121. The clamp washer 161 has a washer portion 1611, the protrusion 1613, the extended protrusion 1615, and a hole 1617. The washer portion 1611 is brought into contact with the drain pipe 111 to fix the position of the sliding member 121. The protrusion 1613 is inserted in the pivot portion 2212 to serve as a center point of pivot operation. The extended protrusion 1615 is extended at a position opposite to the pivot portion 2212. The extended protrusion 1615 serves as a grip portion to manipulate the clamp washer 161. The hole 1617 is formed in the center of the washer portion 1611.

The washer portion 1611 is positioned on the washer shoulder 2214 in the sliding member 121. The drain pipe 111 is fitted in the washer portion 1611, and then the washer portion is adjusted in a horizontal state by the extended protrusion 1615. The posture of the washer portion 1611 is changed in a diagonal direction from the horizontal direction due to the downward expansion of the first spring member 125, and thus the diameter of the hole 1617 is decreased. Accordingly, the inner peripheral portion of the hole 1617 is brought into contact with the outer peripheral portion of the drain pipe 111, and thus the sliding member 121 is fixed. The protrusion 1613 protrudes in a rectangular shape from the end of the washer portion 1611. The extended protrusion 1615 protrudes in a rectangular shape to be opposite to the protrusion 1613. The hole 1617 penetrates the center of the washer portion 1611. The shape of the hole 1617 is determined upon the drain pipe 111 which is fitted in the hole.

The hole 1617 secures the sufficient area which is brought into contact with the outer peripheral surface of the drain pipe 111, regardless of the shape of the drain pipe 111, thereby stably fixing the sliding member 121 to the drain pipe 111.

As illustrated in FIG. 44, the upper coupler 151 is formed of a hollow pipe though which the drain pipe 111 is inserted. The lower end of the upper coupler 151 is provided with a connecting extension 1511 which, is extended in a vertical direction on the basis of the lower end. The trapping cover 152 is fitted to the upper portion of the connecting extension 1511.

As illustrated in FIGS. 45 and 46, the trapping cover 152 has a plate-shaped cover 1521 and a cover support 1522 extended downwardly from the bottom surface of the cover 1521. The cover support 1522 is engaged to the outer peripheral surface of the upper end of the connecting extension 1511 to support the cover 1521. A plurality of cover supports 1522 are spaced, apart from each other in the circumferential direction. The length of the cover support 1522 is longer than the length of the connecting extension 1511 extending from the bottom surface of the upper connecting pipe 151 in the longitudinal direction.

Accordingly, when the trapping cover 152 is engaged to the connecting extension 1511, a space, through which a fluid flows, is formed between the bottom surface of the cover 1521 and, the upper portion of the connecting extension 1511. When the water does not flow through the upper coupler 151, the water remaining in the upper coupler 151 is collected between the trapping cover 152 and the upper portion of the connecting extension 1511 by the trapping cover 152 provided in the upper coupler 151, thereby clogging the space, through which the water flows, and thus preventing gases or bad smells from being flowing backward, or alien matters or bugs from coming in.

While the present invention has been described with reference to the particular illustrative embodiments, it is not to be restricted by the embodiments but only by the appended claims. It is to be appreciated that those skilled in the art can change or modify the embodiments without departing from the scope and spirit of the present invention.

INDUSTRIAL APPLICABILITY

With the above configuration, anyone can easily assemble or disassemble the drain pipe assembly for installation of the basin according to the present invention, without using special tools, and it is possible to shorten the working time. In addition, if the trapping pipe is integrally formed, it is possible to further reduce the number of assembling steps.

The invention claimed is:
1. A drain pipe assembly for a basin, comprising:
a drain pipe (111) which is inserted into a drain port formed in a base of basin (1) and is exposed below the basin (1), and has a flange (113) on an upper end of the drain pipe (111), the flange (113) being caught by the drain port; and
a fastening member which fixes the basin (1) against the flange (113),
wherein the fastening member pulls the drain pipe (111) in a downward direction to upwardly press the basin (1), thereby fastening the basin (1) and the drain pipe (111),
wherein the fastening member includes:
a sliding, member (121) through which the drain pipe (111) slideably passes in a longitudinal direction;
a first spring member (125) which receives the drain pipe (111), and whose lower end is brought into contact with the sliding member (121) and whose upper end is brought into contact with a bottom surface of the base of the basin (1) to resiliently press the bottom surface; and
a fixing member which is provided to fix the sliding member (121) to the drain pipe (111), and
wherein the fixing member includes:
a latch (123) which is rotatably connected to the sliding member (121); and
a second spring member (123*a*) which is provided to resiliently support the latch (131) in a rotation direction to press the drain pipe (111).
2. The drain pipe assembly according to claim 1, wherein a recessed groove (111*a*) is formed on an outer peripheral surface of the drain pipe (111) to receive the latch (123).

* * * * *